(12) United States Patent
Ohashi et al.

(10) Patent No.: US 6,516,261 B2
(45) Date of Patent: *Feb. 4, 2003

(54) CONTROL SYSTEM FOR AUTOMATIC VEHICLE TRANSMISSIONS

(75) Inventors: Tatsuyuki Ohashi, Wako (JP); Norio Nakauchi, Wako (JP); Kazuyuki Konno, Wako (JP); Yoshiharu Saito, Wako (JP); Kenji Hagiwara, Wako (JP); Hideki Wakamatsu, Wako (JP); Yukio Morita, Wako (JP); Takamichi Shimada, Wako (JP)

(73) Assignee: Honda Giken Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/382,205

(22) Filed: Aug. 23, 1999

(65) Prior Publication Data

US 2001/0049573 A1 Dec. 6, 2001

(30) Foreign Application Priority Data

Aug. 24, 1998 (JP) .......................................... 10-253249

(51) Int. Cl.[7] .............................................. G06F 17/00
(52) U.S. Cl. ............................. 701/51; 701/55; 701/56; 701/65; 477/120
(58) Field of Search ............................. 701/51, 53, 54, 701/55, 56, 61, 64, 65, 207, 208, 209, 213; 477/97, 78, 120, 121, 144, 148, 901, 902

(56) References Cited

U.S. PATENT DOCUMENTS

| | | | | |
|---|---|---|---|---|
| 4,285,252 A | * | 8/1981 | Yamaki et al. .............. | 477/120 |
| 4,335,428 A | * | 6/1982 | Miki et al. .................... | 701/65 |
| 5,405,302 A | * | 4/1995 | Yagi et al. ................... | 477/107 |
| 5,716,301 A | * | 2/1998 | Wild et al. ................... | 477/97 |
| 5,832,400 A | * | 11/1998 | Takahashi et al. ............ | 701/53 |
| 5,899,953 A | * | 5/1999 | Urahashi ..................... | 701/117 |
| 5,911,771 A | * | 6/1999 | Reichart et al. .............. | 701/65 |
| 5,931,886 A | * | 8/1999 | Moroto et al. ................ | 701/54 |
| 5,983,154 A | * | 11/1999 | Morisawa .................... | 701/56 |
| 6,070,118 A | * | 5/2000 | Ohta et al. .................... | 701/65 |
| 6,098,004 A | * | 8/2000 | Grytzelius et al. ............ | 701/55 |
| 6,098,005 A | * | 8/2000 | Tsukamoto et al. .......... | 701/65 |
| 6,157,342 A | * | 12/2000 | Okude et al. ............... | 701/208 |
| 6,182,000 B1 | * | 1/2001 | Ohta et al. .................... | 701/55 |
| 6,199,001 B1 | * | 3/2001 | Ohta et al. .................... | 701/51 |

FOREIGN PATENT DOCUMENTS

| JP | 5-71625 | 3/1993 |
|---|---|---|
| JP | 9-229173 | 9/1997 |
| JP | 9-303544 | 11/1997 |

* cited by examiner

Primary Examiner—Jacques H. Louis-Jacques
(74) Attorney, Agent, or Firm—Arent Fox Kintner Plotkin & Kahn

(57) ABSTRACT

A system for controlling an automatic transmission of a vehicle which determines a downgrade or upgrade parameter based on the vehicle acceleration and selects one from among a plurality of shift programs based on the determined grade parameter to determine a gear ratio based on the selected shift program. The system includes a navigation system which determines the instantaneous vehicle position and outputs road information including upgrade/downgrade condition of road including the determined instantaneous vehicle position. In the system, the grade parameter is corrected based on the navigation information and the grade parameter such that the one from among a plurality of shift programs is selected based on the corrected grade parameter, thereby enhancing drivability during downgrade running, without being affected even if the navigation information is temporarily invalid.

13 Claims, 19 Drawing Sheets

FIG.4
MAP NUMBER    0 : STEEP-UPGRADE MAP
                          1 : SLIGHT-UPGRADE MAP
                          2 : LEVEL-ROAD MAP
                          3 : SLIGHT-DOWNGRADE MAP
                          4 : STEEP-DOWNGRADE MAP
                               (CORNER-SPORT MAP)
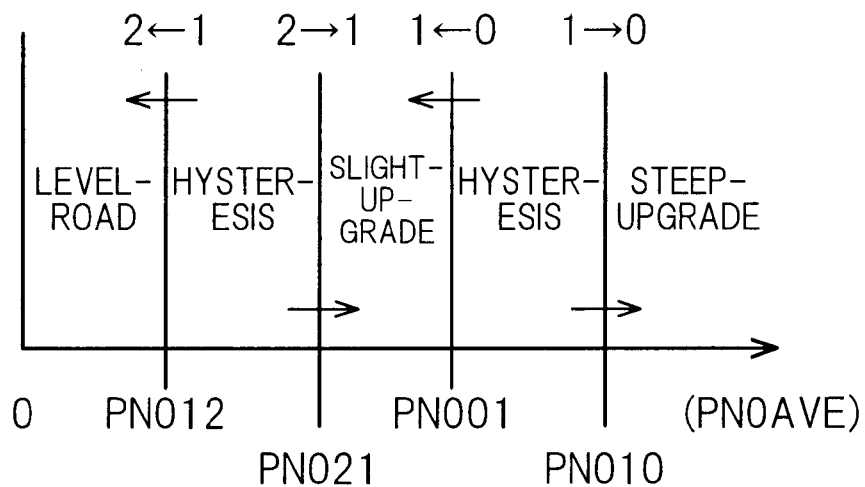
MAP
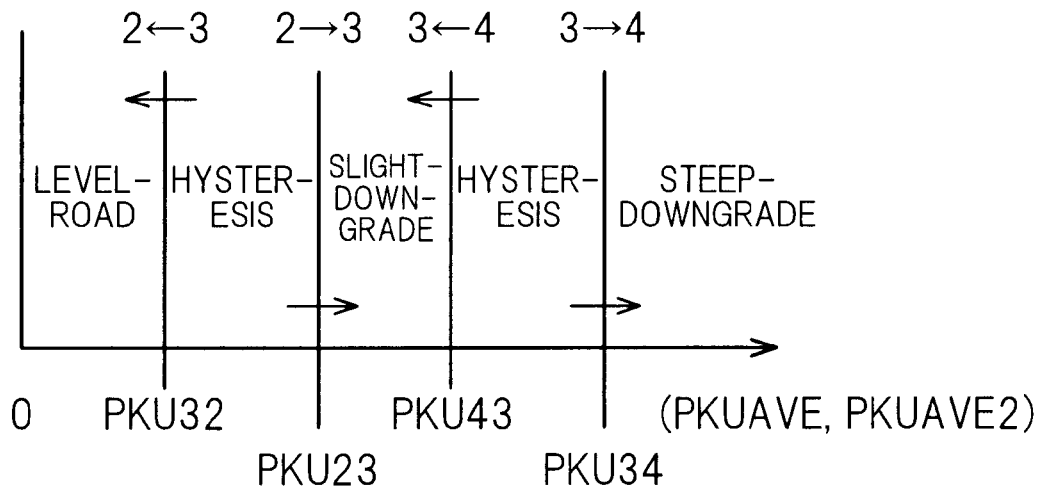

FIG.5

| | | PN001 | PN010 | PN021 | PN021 | PKU23 | PKU32 | PKU34 | PKU43 |
| --- | --- | --- | --- | --- | --- | --- | --- | --- | --- |
| | | 0←1 | 1←0 | | | | | | |
| LARGEST POSSIBLE MAP | MAP2 | 0 | 1 | 1 | 2 | 3 | 3 | 4 | 4 |
| SMALLEST POSSIBLE MAP | MAP1 | 0 | 0 | 1 | 1 | 2 | 3 | 3 | 4 |
| | | STEEP-UPGRADE | SLIGHT-UPGRADE | | LEVEL-ROAD | | SLIGHT-DOWNGRADE | | STEEP-DOWNGRADE (CORNER-SPORT MAP) |

CONTROL SYSTEM FOR AUTOMATIC VEHICLE TRANSMISSIONS

BACKGROUND OF THE INVENTION

1. Field of the Invention

This invention relates to a control system for an automatic vehicle transmission.

2. Description of the Related Art

In a typical prior-art control system for automatic vehicle transmissions, the gear ratio of the automatic transmissions is determined by retrieving a predetermined shift program (map) using the vehicle speed and throttle opening as address data.

Moreover, Japanese Laid-Open Patent Application No. Hei 5 (1993)-71625, for example, teaches a control system for automatic vehicle transmission, in which a parameter indicative of the running resistance, more specifically a parameter indicative of the downgrade or upgrade of vehicle running is determined based on the vehicle and throttle opening to select one from among a plurality of shift programs (shift characteristics) for upgrade, downgrade, etc., and the gear ratio is determined by retrieving the selected program by the vehicle speed and throttle opening such that the gear ratio is appropriate both in upgrade or downgrade vehicle running.

Aside from the above, the range of navigation systems extends to embrace everything from simple orientation aids to guidance systems featuring automatic route determination. The navigation system has a road-map memory stored in a CD ROM or the like, and detects the instantaneous vehicle position by, for example, the GPS (Global Positioning System) satellite position system, and provides directional information on a road map including the detected instantaneous vehicle position.

Since the use of such a navigation information enables the recognition or prediction of the details of the road on which the vehicle is traveling, various attempts have been proposed to utilize the navigation information in the control of automatic vehicle transmissions. For example, Japanese Laid-Open Patent Application No. Hei 9 (1997)-303544 teaches a cooperative control with the use of the conventional shift control and the navigation information.

In this prior-art system, there is a gear ratio determined by the upgrade/downgrade control, which determines whether the vehicle is running upgrade or downgrade based on the vehicle acceleration obtained from the transmission output shaft rotational speed (corresponding to the vehicle speed) and the throttle opening. There is also the gear ratio determined by the cooperative control comprising the navigation system and the conventional shift control system. The gear ratio determined under the upgrade/downgrade control is selected if the gear ratio is less than that determined under the cooperation control, while the gear ratio determined under the cooperative control is selected if the gear ratio is equal to or less than that determined under the upgrade/downgrade control.

In this prior-art system, moreover, when the cooperative control is in progress, the gear ratio determined under this control is always selected. The prior-art system, thus, cooperativizes the conventional shift control and the navigation information, giving the priority to the gear ratio determined under the cooperative control so as to prevent the interference therebetween.

However, since the gear ratio determined under the cooperative control has priority over the gear ratio determined under the upgrade/downgrade control, if the navigation system is temporarily invalid, the gear ratio determined under the cooperative control will accordingly not be free from these errors.

Moreover, Japanese Laid-Open Patent Application Hei 9 (1997)-229173 proposes a control system for an automatic vehicle transmission using the navigation system which stores information including the grade of road. In the system, the running resistance is calculated based on the stored information and the detected vehicle speed, and the engine speed and the torque are calculated such that the calculated engine speed and torque are generated with minimum fuel consumption.

However, when the navigation system is configured to have the entire road grade information, the volume of data becomes huge and the calculation become complicated. In addition, this is disadvantageous in cost.

Furthermore, it is sometimes impossible to determine an instantaneous vehicle position accurately based on the navigation information. When this happens, the control response degrades in response to the instantaneous vehicle positional error. In particular this happens when the vehicle running condition changes from upgrade running to level-road running or downgrade running to level-road running.

Furthermore, when the running resistance is calculated based on the road grade in the navigation information, in other words, when no attention is paid to the change in weight of load, it is difficult to determine the running resistance accurately.

Furthermore, the aforesaid prior art (Japanese Laid-Open Patent Application No. Hei 9 (1997)-229173) proposes calculating a proper vehicle speed while the vehicle is cornering, based on the grade of roads in the navigation information, and determining the necessity of deceleration based on the calculated proper vehicle speed, instantaneous vehicle position and the detected vehicle speed such that shift is effected at a timing matched to the vehicle operator's intention to decelerate.

However, as mentioned above, when the navigation system is configured to have the entire road grade information, the volume of data becomes huge and the calculation become complicated, rendering disadvantageous in cost.

Nevertheless, it is difficult to conduct the shift control appropriately when the vehicle is cornering, without the road grade information. The fact that the necessity of downshift is not the same for a downgrade corner and an upgrade corner, increases the difficulty in this kind of shift control. In any case, it is desirable to effect control to be matched to the intention of the vehicle operator.

BRIEF SUMMARY OF THE INVENTION

An object of this invention is therefore to overcome the aforesaid drawbacks and to provide a control system for automatic vehicle transmission, which determines a parameter indicative of the downgrade or upgrade of vehicle running and selects one from among a plurality of shift programs (shift characteristics) so as to determine the gear ratio appropriate for upgrade/downgrade running, and which determines the gear ratio more appropriately by incorporating the navigation information in the shift control, while preventing the gear ratio determination from being affected by the navigation information if the navigation information is temporarily invalid.

Another object of this invention is therefore to overcome the aforesaid drawbacks and to provide a control system for automatic vehicle transmission, which determines a parameter indicative of the downgrade or upgrade of vehicle running and selects one from among a plurality of shift programs (shift characteristics) so as to determine the gear ratio appropriate for upgrade/downgrade running, and which determines the gear ratio more appropriately by incorporating navigation information of reduced volume in the shift control, while preventing the gear ratio determination from being affected by the navigation information if the navigation information is temporarily invalid and thus preventing the control response from being degraded.

Yet another object of this invention is therefore to overcome the aforesaid drawbacks and to provide a control system for automatic vehicle transmission, which determines a parameter indicative of the downgrade or upgrade of vehicle running and selects one from among a plurality of shift programs (shift characteristics) so as to determine the gear ratio appropriate for upgrade/downgrade running, and which determines the gear ratio more appropriately by incorporating the navigation information in the shift control, while making it unnecessary for the navigation information to include the grade of roads, while estimating the weight of load to correct the grade parameter by the estimated weight of load.

Yet still another object of this invention is therefore to overcome the aforesaid drawbacks and to provide a control system for automatic vehicle transmission, which determines a parameter indicative of the downgrade or upgrade of vehicle running and selects one from among a plurality of shift programs (shift characteristics) so as to determine the gear ratio appropriate for upgrade/downgrade running, and which determines the gear ratio more appropriately by incorporating the navigation information in the shift control, while making it unnecessary for the navigation information to include the grade of roads, while enabling to conduct the shift control when cornering on a specific road, in particular a downgrade road or a level road so as to match the intention of the vehicle operator, thereby enhancing the drivability.

In order to achieve the objects, there is provided a system for controlling an automatic transmission of a vehicle having an input shaft connected to an internal combustion engine mounted on the vehicle and an output shaft connected to driven wheels of the vehicle, the transmission transmitting output torque generated by the engine to the driven wheels through the output shaft, comprising: operating condition detecting means for detecting operating conditions of the engine and the vehicle including at least a vehicle speed and a throttle opening; grade parameter determining means for determining a grade parameter indicative of upgrade or downgrade of a road on which the vehicle runs; shift program selecting means for selecting one from among a plurality of shift programs based on the determined grade parameter to determine a gear ratio based on the selected shift program; road information outputting means for determining an instantaneous vehicle position and for outputting road information including that at the determined instantaneous vehicle position; and grade parameter correcting means for correcting the grade parameter based on at least one of the outputted road information and the grade parameter; wherein the shift program selecting means selects the one from among a plurality of shift programs based on the corrected grade parameters to determine the gear ratio based on the selected shift program.

BRIEF DESCRIPTION OF THE DRAWINGS

This and other objects and advantages of the invention will be more apparent from the following description and drawings, in which:

FIG. 4 is an explanatory view showing the map selection based on the average value indicative of the grade parameter more specifically;

FIG. 5 is an explanatory view similarly showing the map selection based on the average value indicative of the grade parameter;

DETAILED DESCRIPTION OF THE PREFERRED EMBODIMENTS

An embodiment of the invention will now be explained with reference to the attached drawings.

Figure 1:
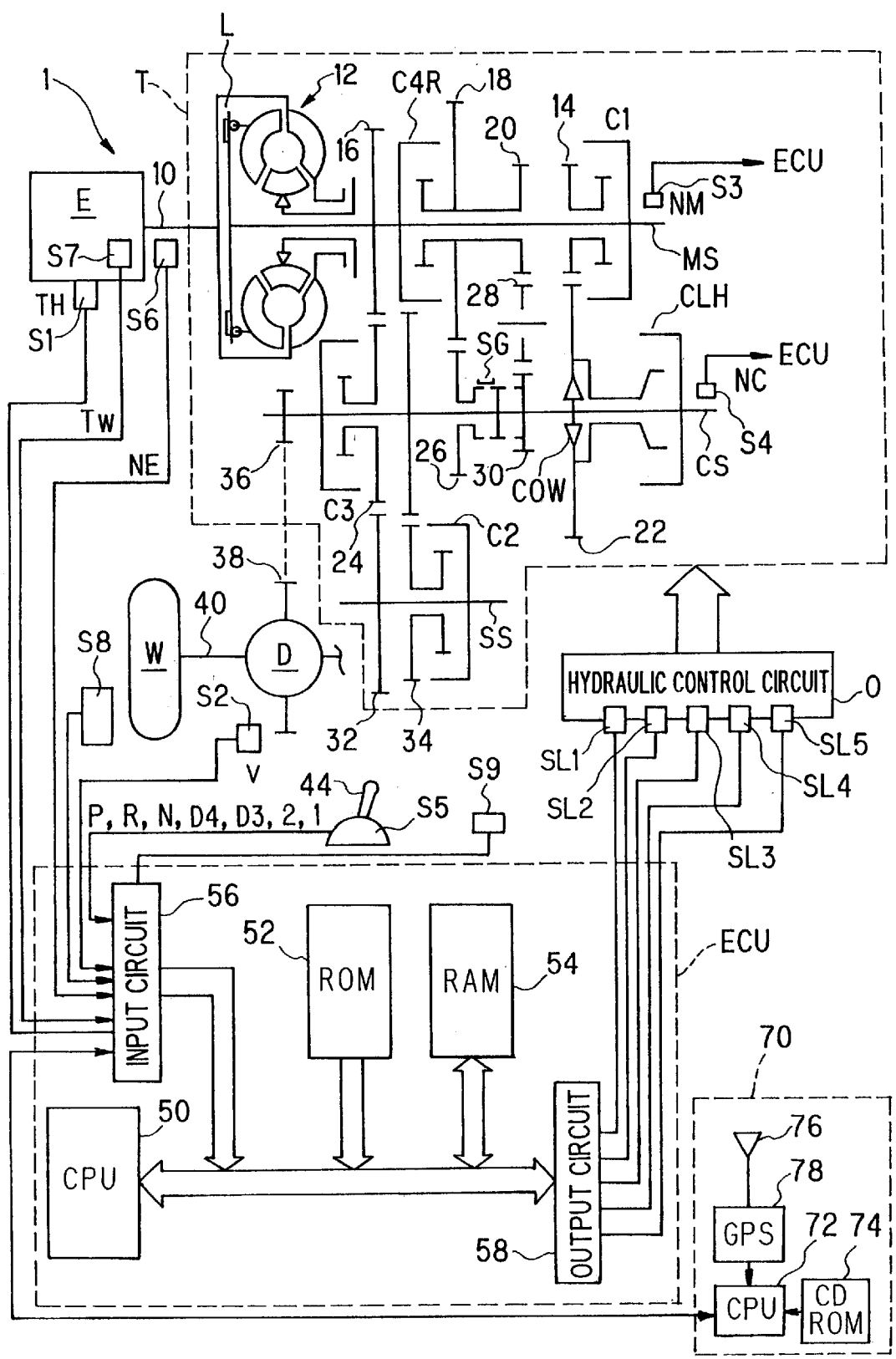
FIG. 1 is an overall schematic view of a control system for an automatic vehicle transmission according to the invention.

FIG. 1 is an overall schematic view of a control system for an automatic vehicle transmission according to the invention.

As shown in FIG. 1, a vehicle 1, illustrated partially by a driven wheel W (referred to later), etc., has an internal combustion engine E (referred to simply as "engine") mounted thereon and an automatic vehicle transmission T (referred to simply as "transmission").

The transmission T is equipped with a main shaft (transmission input shaft) MS connected to a crankshaft 10 of the engine E through a torque converter 12 having a lockup mechanism L. The automatic transmission is configured to be a parallel-shaft type and has a countershaft CS and a secondary shaft SS provided in parallel with the main shaft MS and the countershaft CS. These shafts carry gears.

More specifically, the main shaft MS carries a main first gear 14, a main third gear 16, a main fourth gear 18 and a main reverse gear 20. The countershaft CS carries a counter first gear 22 which meshes with the main first gear 14, a counter third gear 24 which meshes with the main third gear 16, a counter fourth gear 26 which meshes with the main fourth gear 18 and a counter reverse gear 30 which meshes with the main reverse gear 20 through a reverse idle gear 28.

The secondary shaft SS carries a first secondary second gear 32 and a second secondary second gear 34. 1st gear (first-speed) is established or effected when the main first gear 14 rotatably mounted on the main shaft MS is engaged with the main shaft MS by a first-gear hydraulic clutch C1.

Since the first-gear hydraulic clutch C1 is kept in the engaged state during establishment of the 2nd to 4th gears, the counter first gear 22 is fixed by a one-way clutch COW. A first-gear-hold clutch CLH is provided such that the engine E is driven from the driven wheel W, in other words the engine braking is effected when the 1 or 2 range is selected.

2nd gear (second-speed) is established via the main third gear 16, the counter third gear 24 and the first secondary second gear 32, when the second secondary second gear 34 rotatably mounted on the secondary shaft SS is engaged with the secondary shaft SS by a second-gear hydraulic clutch C2.

3rd gear (third-speed) is established when the counter third gear 24 rotatably mounted on the countershaft CS is engaged with the countershaft CS by a third-gear hydraulic clutch C3.

4th gear (fourth-speed) is established when the counter fourth gear 26 rotatably mounted on the countershaft CS is engaged with the countershaft CS by a selector gear SG and with this state maintained the main fourth gear 18 rotatably mounted on the main shaft MS is engaged with the main shaft MS by a fourth-gear/reverse hydraulic clutch C4R.

The reverse gear is established when the counter reverse gear 30 rotatably mounted on the countershaft CS is engaged with the countershaft CS by the selector gear SG and with this state maintained the main reverse gear 20 rotatably mounted on the main shaft MS is connected with the main shaft MS by the fourth-gear/reverse hydraulic clutch C4R.

The rotation of the countershaft CS is transmitted through a final drive gear 36 and a final driven gear 38 (which meshes with the gear 34) to a differential D, from where it is transmitted to the driven wheel W, through left and right drive shafts 40, 40.

A throttle position sensor (engine load detecting means) S1 is provided in the air intake pipe (not shown) of the engine E at a point in the vicinity of a throttle valve (not shown) and generates a signal indicative of the degree of throttle valve opening TH. A vehicle speed sensor (vehicle speed detecting means) S2 is provided in the vicinity of the final driven gear 38 and generates a signal indicative of the vehicle traveling speed V from the rotational speed of the final driven gear 38.

An input shaft rotational speed sensor S3 is provided in the vicinity of the main shaft MS and generates a signal indicative of the rotational speed NM of the transmission input shaft from the rotation of the main shaft MS. An output shaft rotational speed sensor S4 is provided in the vicinity of the countershaft CS and generates a signal indicative of the rotational speed NC of the transmission output shaft from the rotation of the countershaft CS.

A shift lever position sensor S5 is provided in the vicinity of a shift lever 24 installed on the vehicle floor near the driver's seat and generates a signal indicating which of the seven positions P, R, N, D4, D3, 2 and 1 is selected by the driver.

A crankshaft sensor S6 is provided in the vicinity of the crankshaft 10 of the engine E and generates a signal indicative of the engine speed NE from the rotation of the crankshaft 10. A coolant temperature sensor S7 is provided at an appropriate location in the cylinder block and generates a signal indicative of the engine coolant temperature Tw.

A brake switch S8 is provided in the vicinity of a brake pedal (not shown) and generates a signal indicating whether the brake is in operation. An oil temperature sensor S9 is provided at an appropriate location of the transmission T and generates a signal indicative of the oil temperature, i.e., the temperature of Automatic Transmission Fluid.

The outputs of the sensors S1, etc., are sent to an ECU (electronic control unit).

The ECU is constituted as a microcomputer comprising a CPU (central processing unit) 50, a ROM (read-only memory) 52, a RAM (random access memory) 54, an input circuit 56 and an output circuit 58. The outputs of the sensors S1, etc., are input to the microcomputer from the input circuit 56. The CPU 50 of the microcomputer controls shifting and the operation of the lockup clutch L of the torque converter 12.

The ECU is connected to a hydraulic control circuit O, which includes magnetic solenoid valves SL1, SL2 for switching the shift valves (not shown) to effect gearshift, a magnetic solenoid valve SL3 for turning on/off the lockup clutch and a magnetic solenoid valve SL4 for regulating lockup clutch engagement, and a magnetic solenoid valve SL5 for regulating the pressure applied to the hydraulic clutches.

The ECU determines and supplies command values to the hydraulic control circuit O through the output circuit 58. More specifically, the CPU 50 determines the gear (gear ratio) to be shifted to and energizes/deenergizes the solenoid valves SL1, SL2 of the hydraulic circuit O via the output circuit 58 so as to switch shift valves and thereby shift gears, and regulates the pressure applied to the hydraulic clutches via the solenoid control valve SL5. It also controls the on/off operation of the lockup clutch L of the torque converter 12 through the solenoid valve SL3 and controls the capacity of the lockup clutch through the solenoid valve SL4.

Moreover, this system is equipped with a navigation system 70. The navigation system 70 has a CPU 72, a CD ROM 74 which stores the navigation information including the road map of places where the vehicle 1 is expected to travel, the directional information on the road map and the other information such as whether the places are mountain roads or town roads, etc., and a GPS (Global Positioning System) receiver 78 which receives the signal from the GPS satellite position system. The navigation information is relatively small in volume and does not include the grade of road, etc. The navigation system 70 detects the instantaneous position of the vehicle 1.

The CPU 50 of the ECU is connected with the CPU 72 of the navigation system 70 bi-directionally such that the CPU 50 inputs the aforesaid navigation information through the CPU 72 of the navigation system 70 and conducts a cooperative control (referred hereinafter as "cooperative shift control with navigation").

The operation of the system will be explained.

For ease of understanding, the aforesaid shift control proposed in Japanese Laid-Open Patent Application No. Hei 5 (1993)-71625 is a basis for the control system according to the present invention. The present invention, will be explained with reference to the flow chart shown in FIG. 2. The program shown there is executed once every 20 msec.

Figure 2:
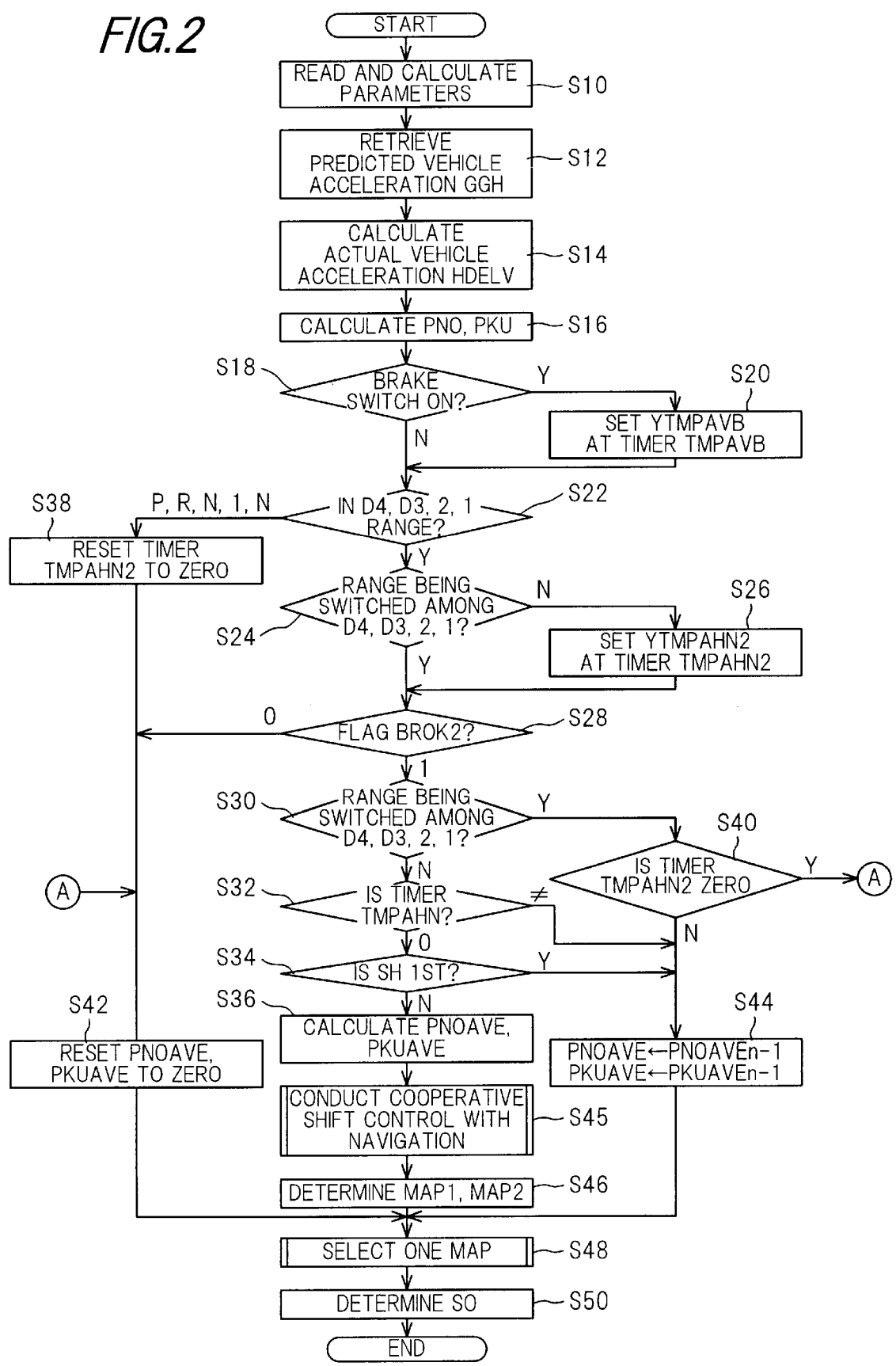
FIG. 2 is a flow chart showing the operation of the system illustrated in FIG. 1.
Figure 3:
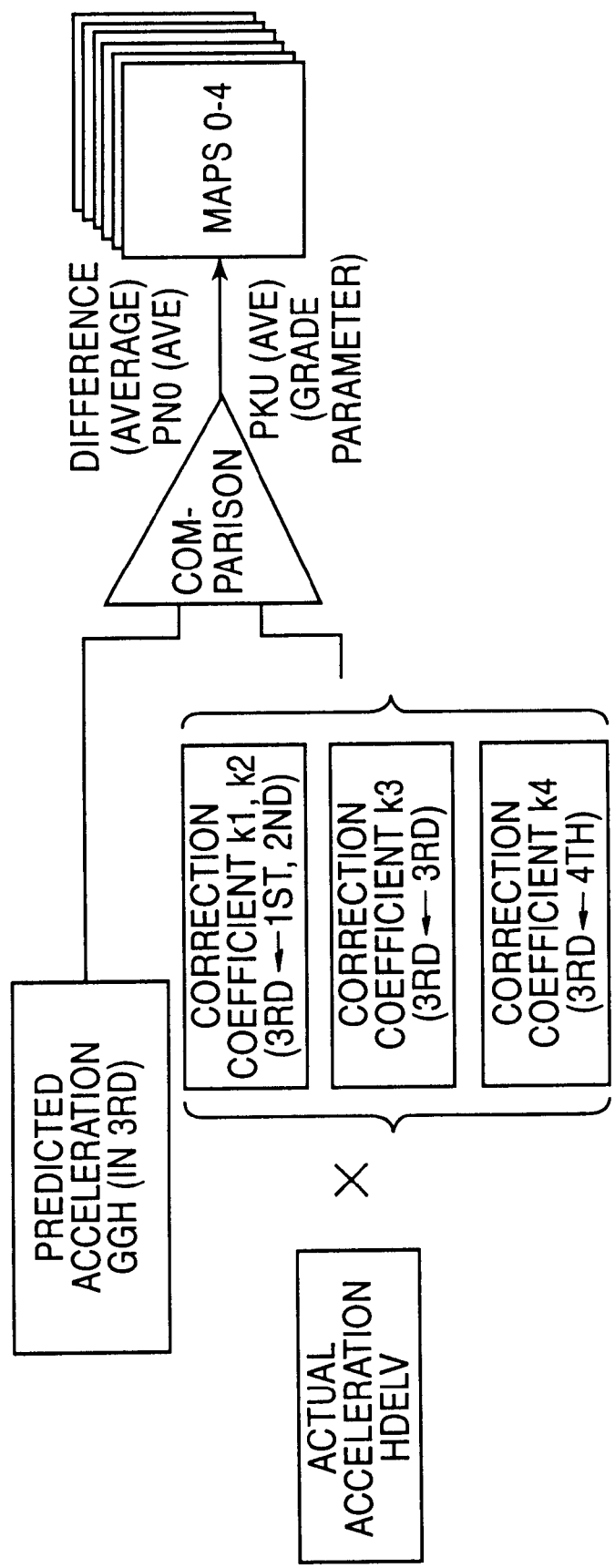
FIG. 3 is an explanatory view showing selection of five maps based on the average value indicative of a grade parameter between the predicted acceleration and the actual acceleration referred to the in the flow chart of FIG. 2, on which the invention is based.

Giving an outline of the procedures shown in FIG. 2, as illustrated in FIG. 3, a predicted vehicle acceleration (named GGH) which the vehicle would have during running on a level road at 3rd gear, is prepared in advance as mapped data to be retrieved by at least the vehicle speed V and the throttle opening (engine load) TH. Actual vehicle acceleration (named HDELV) which the vehicle actually generates is calculated based on the first-order difference of the vehicle speed V. Then a correction coefficient Kn is retrieved from mapped data that has been determined beforehand using the vehicle speed V and the throttle opening TH. The calculated actual vehicle acceleration is multiplied by the correction coefficient and is corrected to a value estimated to be the actual vehicle acceleration at the 3rd-gear-running.

Then the difference (named PNO or PKU) between the actual vehicle acceleration HDELV and the predicted vehicle acceleration GGH is calculated as PNO=GGH−HDELV and PKU=HDELV−GGH. When PNO is a positive value, it means that the vehicle runs on an upgrade road (i.e., climbing a hill). On the other hand, when PKU is a positive value, it means that the vehicle runs on a downgrade road (i.e., descending a hill). If PNO or PKU is a small positive value, it means that the vehicle runs on a level road. Then, the difference PNO or PKU is averaged to determine a parameter indicative of the grade of road on which the vehicle runs, more specifically an upgrade parameter PNOAVE or a downgrade parameter PKUAVE. One from among a plurality of shift programs (maps) is selected based on the determined grade parameter and the gear ratio is determined by retrieving the selected shift program using the vehicle speed V and throttle opening TH. Since the details of the control is described in the publication, the explanation will be made in brief.

In the flow chart, the program begins in S10 in which parameters used in the control including the vehicle speed V, the throttle opening TH are read or calculated. The program then proceeds to S12 in which the predicted vehicle acceleration GGH is calculated. As mentioned above, the predicted vehicle acceleration GGH is prepared in advance as mapped data to be retrieved by the vehicle speed V and the throttle opening TH.

The program proceeds to S14 in which the actual vehicle acceleration HDELV is calculated in the manner mentioned above, and proceeds to S16 in which the difference PNO or PKU between the predicted vehicle acceleration and the actual vehicle acceleration is calculated, to S18 in which it is determined whether the signal output from the brake switch S8 is ON. When the result in S18 is affirmative, the program proceeds to S20 in which a brake timer (down-counter) TMPAVB is set with a predetermined value YTMPAVB and is started to count down. Thus, the timer measures the time lapse since the brake pedal is released. This is because the braking force will not become zero immediately after the pedal was released. The corresponding value of YTMPAVE is set on the counter and braking is assumed to be continued until a period corresponding to when the value has expired.

Then, the program proceeds to S22 in which it is determined whether the range selected by the vehicle operator is D4, D3, 2 or 1 and therefore needs the upgrade/downgrade shift control. When the result of S22 is affirmative, the program proceeds to S24 in which it is determined whether the range switching among the three ranges is in progress. When the result is negative, the program proceeds to S26 in which another timer (down-counter) TMPAHN2 is set with a predetermined value YTMPAHN2 and starts to measure time lapse to check whether the range switching is functioning properly.

Then, the program proceeds to S28 in which it is determined from the bit of a flag BRKOK2 whether the brake switch signal is 1 or 0. When the bit is 1 and the brake switch signal is determined to be normal, the program proceeds to S30 in which it is again determined whether the switching among the four ranges is in progress. When the result in S30 is negative, the program proceeds to S32 in which it is determined whether or not a value of a third timer TMPAHN (down counter) has reached zero. This timer is used for determining whether shift is in progress.

When it is determined in S32 that the timer value has reached zero, since this means that no shift is in progress, the program proceeds to S34 in which it is determined whether the gear (gear ratio) currently engaged (named SH) is 1st gear. This determination is made for simplifying calculation, since no downshift is possible in 1st gear.

When the result in S34 is negative, the program proceeds to S36 in which the average value (upgrade/downgrade parameter) PNOAVE or PKUAVE of the difference PNO or PKU is determined by calculating a weighted average value between the current and last differences.

On the other hand, when the result in S22 is negative, the program proceeds to S38 in which the timer TMPAHN2 is reset to zero, and to S42 in which the average value of the difference (upgrade/downgrade parameter) is made zero. The same procedures will be taken when S28 finds that the brake switch signal is not normal.

When S30 finds that the range switching is in progress, the program proceeds to S40 in which it is determined whether the timer value TMPAHN2 has reached zero. Since this means that the range switching continues for a long period, it can be considered that a failure such as a wire breaking has occurred in the shift lever position sensor S5. As a result, the program proceeds to S42 in which the average value of the difference (upgrade/down grade parameter) is made zero. When the result in S40 is negative, the program proceeds to S44 in which the average value of the difference is held to the value at the preceding cycle (n−1).

When S32 determines that shift is in progress, since it is not possible to determine a gear (gear ratio) to be shifted to and it is difficult to accurately determine the actual vehicle acceleration, the program proceeds to S44. This is the same when the result in S34 is affirmative.

The program then proceeds to S45 in which a cooperative shift control with the navigation information outputted from the navigation system 70 is conducted. This will be explained later.

The program then proceeds to S46 in which the smallest possible map number (MAP1) and the largest possible map number (MAP2) are determined. In this control, as mentioned above, a plurality of maps (shift programs), more specifically, five maps comprising a steep-upgrade map, a slight-upgrade map, a level-road map, a slight-downgrade map and a steep-downgrade map are prepared beforehand as illustrated in FIG. 4. They are identified by numbers from 0 to 4. In addition, another map (shift program) named "corner-sport map" is prepared beforehand to be used in a cooperative shift control (explained later) conducted when the vehicle runs on a downgrade road with corners.

The procedure in S46 is to compare the average value of the difference PNOAVE or PKUAVE (or PKUAVE2) with reference values PNOnm, PKUnm illustrated in FIGS. 4 and 5 and to determine the smallest possible map in number (MAP1) and the largest possible map in number (MAP2).

Figure 6:
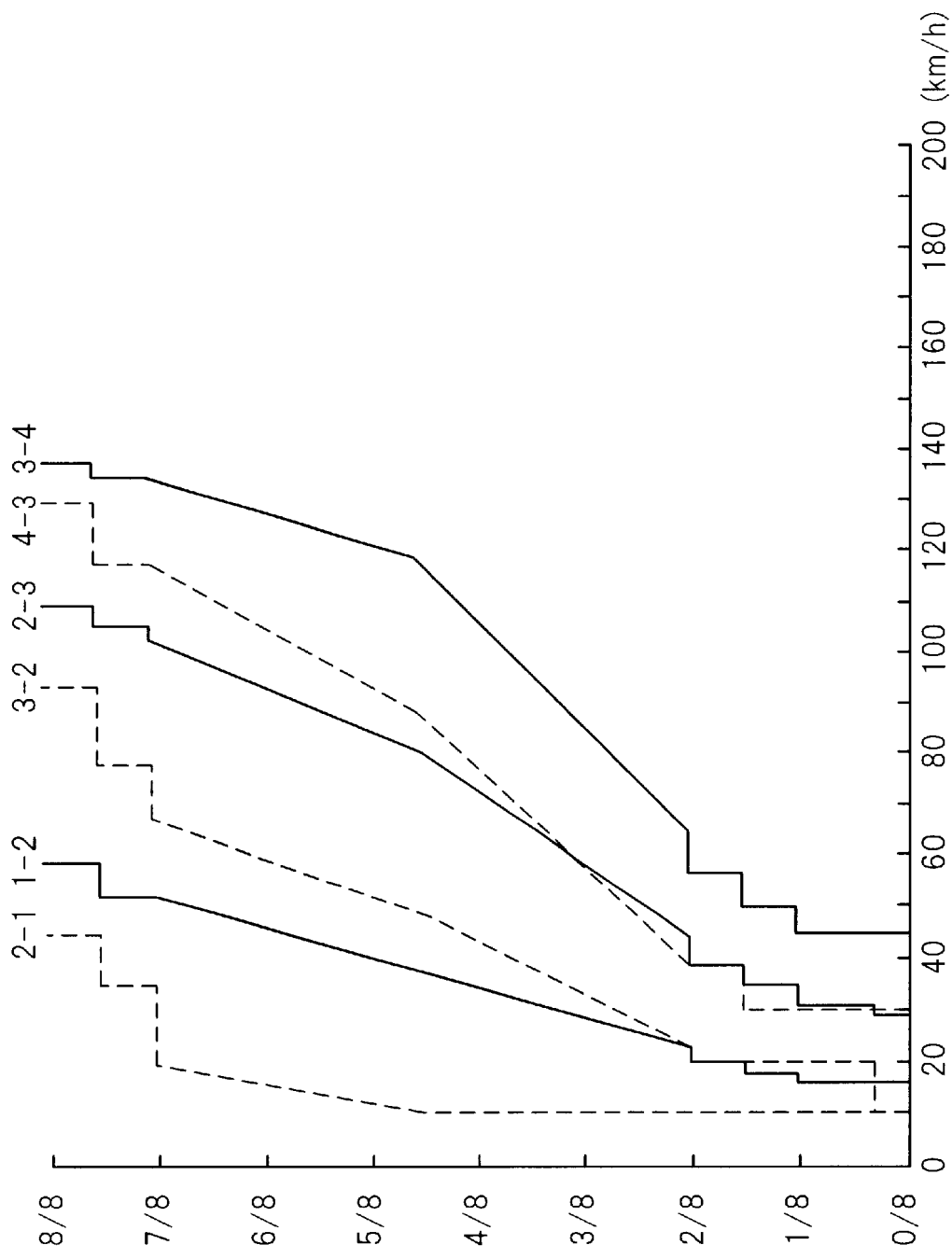
FIG. 6 is an explanatory graph showing a level-road map (shift program) among of the five maps illustrated in FIGS. 3 to 5.
Figure 7:
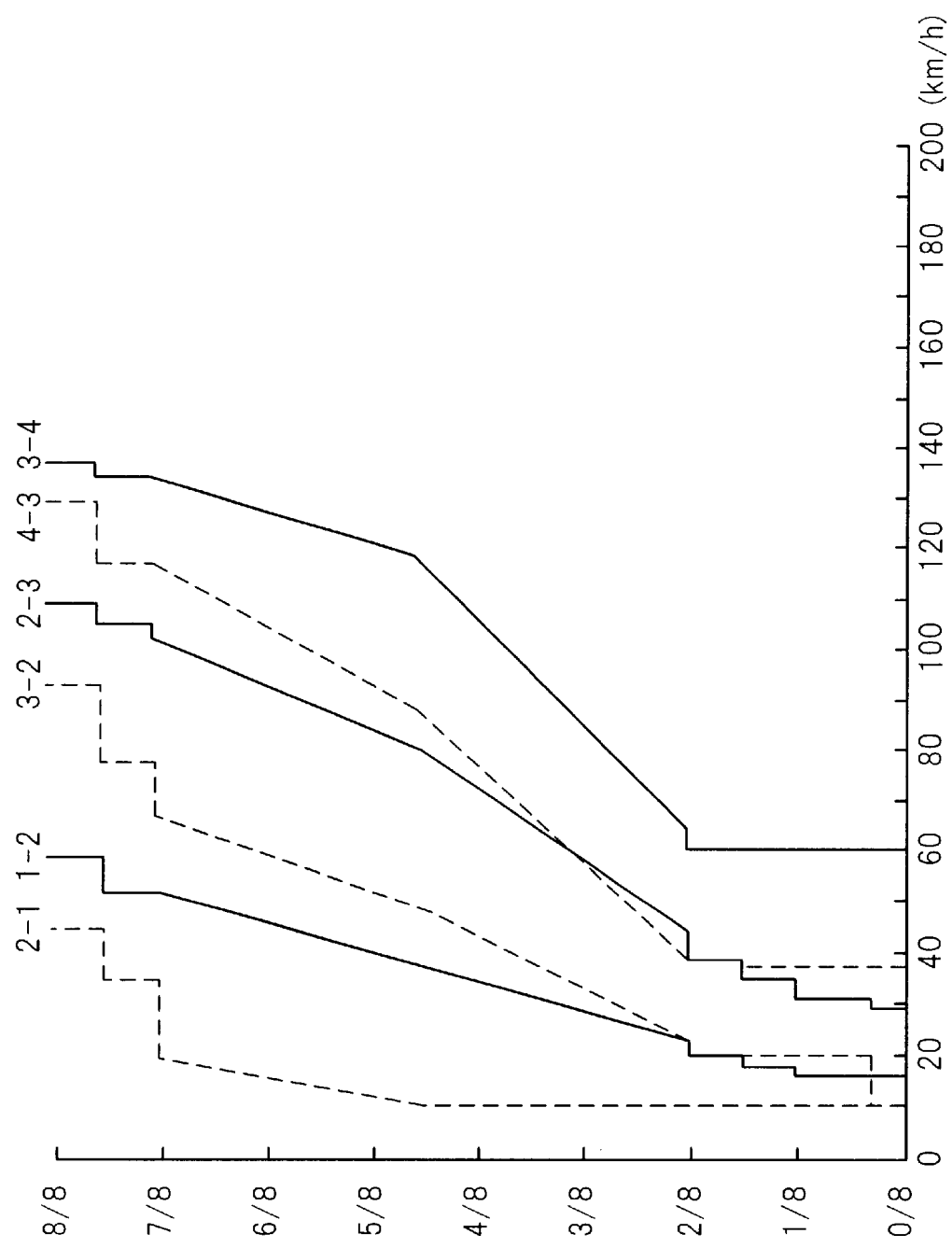
FIG. 7 is an explanatory graph showing a slight-upgrade (downgrade) map (shift program) among of the five maps illustrated in FIGS. 3 to 5.
Figure 8:
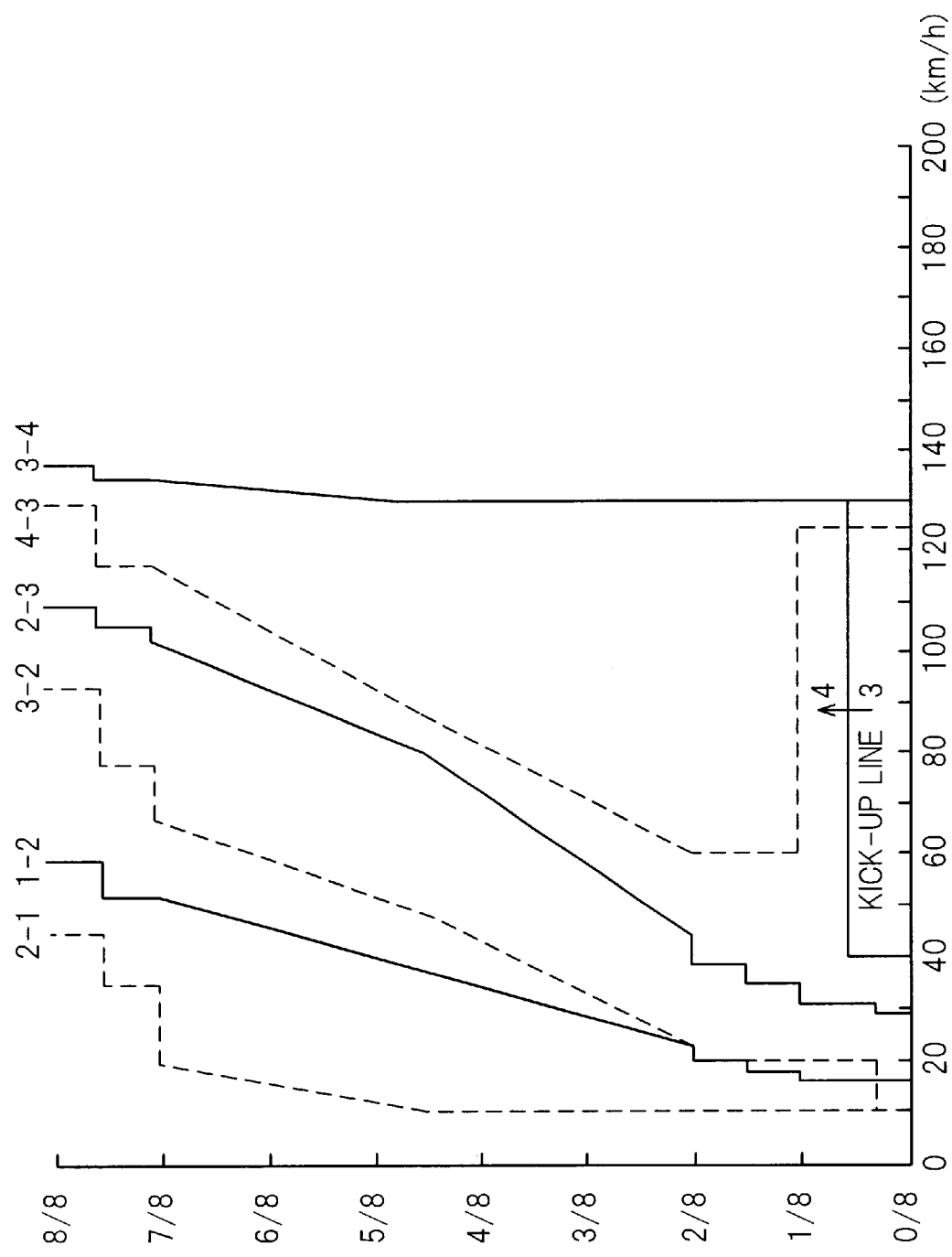
FIG. 8 is an explanatory graph showing a steep-upgrade map (shift program) among of the five maps illustrated in FIGS. 3 to 5.
Figure 9:
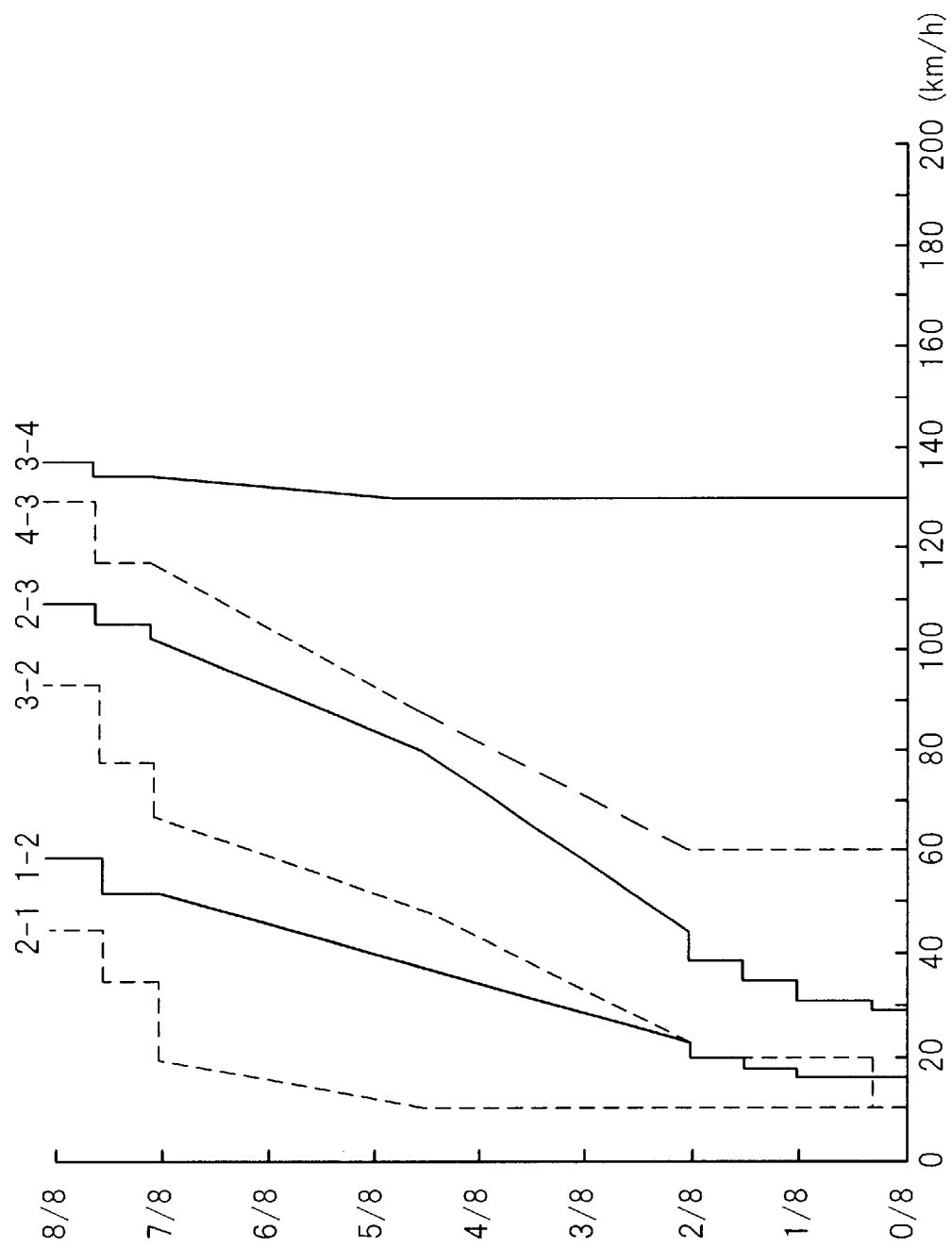
FIG. 9 is an explanatory graph showing a corner-sport map (shift program) used in addition to the five maps illustrated in FIGS. 3 to 5.

FIG. 6 illustrates the characteristic of the level-road map; FIG. 7 illustrates the slight-upgrade (or slight-downgrade) map; FIG. 8 illustrates the steep-downgrade map; and FIG. 9 illustrates the corner-sport map. (The characteristics of the slight-upgrade map and the slight-downgrade map are the same.)

As shown, these characteristics of these maps are different in setting the 3rd-gear region. Specifically, the slight-upgrade (downgrade) map 3rd-gear region is broadened at the small throttle opening area compared to that of the level-road map. The steep-downgrade map 3rd-gear region is broadened at the medium and large throttle opening areas compared to that of the slight-upgrade (downgrade) map. (The steep-downgrade map 3rd-gear region is decreased at the small opening area for facilitating upshift.)

Returning to the explanation of the flow chart of FIG. 2, the program proceeds to S48 in which one map is selected (determined) based on the smallest possible map (MAP1) and the largest possible map (MAP2).

Figure 10:
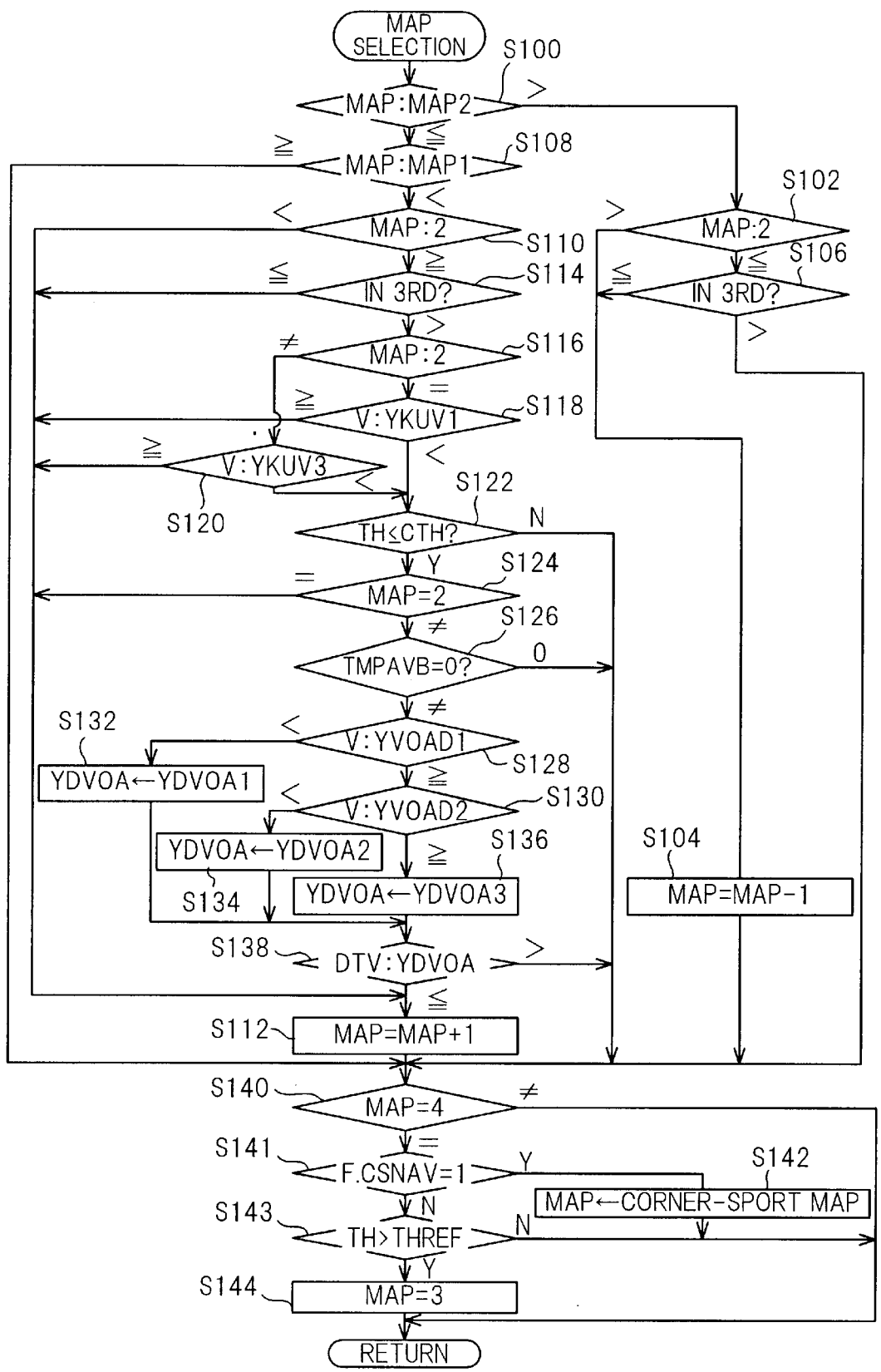
FIG. 10 is a flow chart showing the subroutine of map selection (determination) referred to in the flow chart of FIG. 2.

FIG. 10 is a flow chart showing the subroutine for this selection. The selection is conducted based on the map number assigned to each map.

Explaining the flow chart, the program begins in S100 in which the currently selected map number (MAP) and MAP2 (the largest possible map number) are compared with each other. Logically, it suffices that the largest possible map number≧the selected map number≧the smallest possible map number.

Therefore, when S100 finds that the current map number is greater than the largest possible map number, then the number of the map currently selected must be one of 1, 2, 3 and 4, (it cannot be 0). The program then proceeds to S102 in which it is determined whether the current map number is 2 (level-road map).

If it is determined in S102 that the current map number is greater than 2, since this indicates that the map number currently selected is 3 or 4 (downgrade maps), the program proceeds to S104 in which the number of the map to be selected is determined to be that obtained by subtracting 1 from the current map number.

On the other hand, when it is determined in S102 that the current map number is less than or equal to 2 (level road map) this indicates the map currently selected is number 2 or 1, and this also means that the map will switch from the level-road map to the slight-upgrade map or from the slight-upgrade map to the steep-upgrade map. In this case, since the 3rd-gear region is different for different maps, if the map switching is conducted when the current gear is 4th, the gear could immediately shift down to 3rd. This is not likely to be what the vehicle operator expects and is thus undesirable.

For avoiding this, the program proceeds to S106 in which it is determined whether the current gear is less than or equal to 3rd, and when it is determined that the current gear is less than or equal to 3rd, the program proceeds to S104 in which the map is switched from the level-road map to the slight-upgrade map, or from the slight-upgrade map to the steep-upgrade map. Thus, map switching is suspended when the current gear is 4th.

When S100 finds that the current map number is less than or equal to the largest possible map number, since this means that the upper limit condition is met, the program proceeds to S108 in which a determination is next made regarding the lower limit condition. Specifically, the current map number (MAP) is compared with the smallest possible map number (MAP1) and if the current map number is found to be greater or equal to the smallest possible map number (MAP1), since the aforesaid logical relationship is met and the map is not changed.

When it is determined in S108 that the current map number is less than the smallest possible map number, this means that the current map number is 0, 1, 2 or 3 (it can not be 4) and since it becomes necessary to switch to a map number greater or equal to the smallest possible map number, the program proceeds to S110 in which the current map number (MAP) is compared with 2 (the level road map).

If the current map number is found to be less than 2 (the level-road map), since this means that the map number to be selected is 1 or 2, the program proceeds to S112 in which 1 is added to the number of the current map to correct the same. Accordingly, if the slight-upgrade map is currently in use, it will be switched to the level-road map, and if the steep-upgrade map is currently in use, it will be switched to the slight-upgrade map.

If S110 finds that the current map number is greater or equal to 2 (the level road map), this means that the current map number is 2 or 3. However, increasing from 2 or 3 could lead to the problem regarding the broadening of the 3rd-gear region.

Accordingly, the program proceeds to S114 in which it is determined whether the current gear is less than or equal to 3rd and when the result is affirmative, since this indicates that no unexpected downshift will occur, the program proceeds to S112 in which map switching is carried out immediately. On the other hand, if the current gear is determined to be 4th, the program proceeds to S116 in which the current map number (MAP) is again compared with 2 (the level road map).

If S116 finds that the current map is the level-road map, the program proceeds to S118 in which the detected vehicle speed V is compared with a prescribed value YKUV1. If it is determined that the current map is not the level-road map, i.e., if it is determined that current map is the slight-downgrade map, the program proceeds to S120 in which the detected vehicle speed V is compared with another prescribed value YKUV3. If the vehicle speed is found to be greater or equal to the prescribed value in either of S118 or S120 the program jumps to S112 and map switching is carried out. These procedures are for preventing the vehicle operator from experiencing an unexpected downshift.

When the vehicle speed is determined to be less than the prescribed value in either of S118 or S120, the program proceeds to S122 in which it is determined whether the detected throttle opening TH is less than or equal to a prescribed at or near the full-closed throttle opening CTH. If the result is negative, since this means that the accelerator pedal is being depressed and the accelerator pedal is being depressed at 4th gear, the program skips S112 to avoid map switching so as to prevent the downshift from happening.

On the other hand, when the result in S122 is affirmative, since this means that the accelerator pedal is not being depressed and implies that the vehicle operator wants to decelerate, the program proceeds to S124 in which it is again determined whether the current map is the level-road map. When the result is affirmative, the program proceeds to S112 in which the map is changed.

On the other hand, when the result in S124 is negative, since this indicates that the current map is the slight-downgrade map, the program proceeds to S126 in which it is determined whether or not the brake is being applied and therefore it is discerned whether the vehicle operator, in fact, wants to decelerate. If it is determined that the brake is not being applied, since this can be taken to mean that it is not the vehicle operator's intention to decelerate, the program skips S112 and the map is not changed.

If it is determined that the brake is being applied, the program proceeds to S128 to S136 to select the degree of deceleration data YDVOA, to SL138 in which the selected degree of deceleration data YDVOA is compared with the actual degree of deceleration DTV (vehicle speed decrease amount per unit time during braking). When it is determined that the actual degree of deceleration DTV is less than or equal to the selected degree of deceleration data YDVOA, determining that rapid deceleration is in progress, the program proceeds to S112 to conduct map switching.

Specifically, notwithstanding the fact that the vehicle operator has applied braking and intends to decelerate, since the degree of deceleration at downshift increases with increasing vehicle speed, this control is configured such that a greater degree of deceleration due to braking is required for map switching with increasing vehicle speed, while map switching is conducted only when it is determined from the result of comparison that rapid deceleration is intended. When S138 finds that the actual degree of deceleration DTV is greater than the selected degree of deceleration data YDVOA, the program skips S112.

The program then proceeds to S140 in which it is determined whether the determined corrected map is 4 (i.e., the steep-downgrade map), and when the result is negative, the program skips the following steps. On the other hand, when the result in S140 is affirmative, the program proceeds to S141 where it is determined whether the bit of a flag F.CSNAVI (explained later) is 1, and if the result is affirmative, the program proceeds to S142 in which the map is switched to the corner-sport map. This will be referred to later.

When the result in S141 is negative, the program proceeds to S143 in which it is determined whether the detected throttle opening TH is greater or equal to a prescribed throttle opening THREF (e.g., (⅔)×Wide-Open Throttle [degrees]). When the result is negative, the program skips the following steps. When the result is affirmative, on the other hand, the program proceeds to S144 in which the map is forcibly switched to 3 (i.e., the slight-downgrade map).

Conceivably, the fact that the throttle valve is depressed by the amount greater or equal to THREF indicates that the vehicle operator does not want the engine braking effect. Rather, this would mean that the vehicle operator wishes to accelerate. The map is accordingly switched to the slight-downgrade map.

Returning to the explanation of the flow chart of FIG. 2, the program proceeds to S50 in which an output gear (gear ratio) to be shifted to (named SO) is determined in accordance with the selected (determined) map using the detected vehicle speed V and throttle opening TH as address data.

Based on the above, the cooperative shift control with navigation referred to in S45 of this flow chart will be explained.

Figure 11:
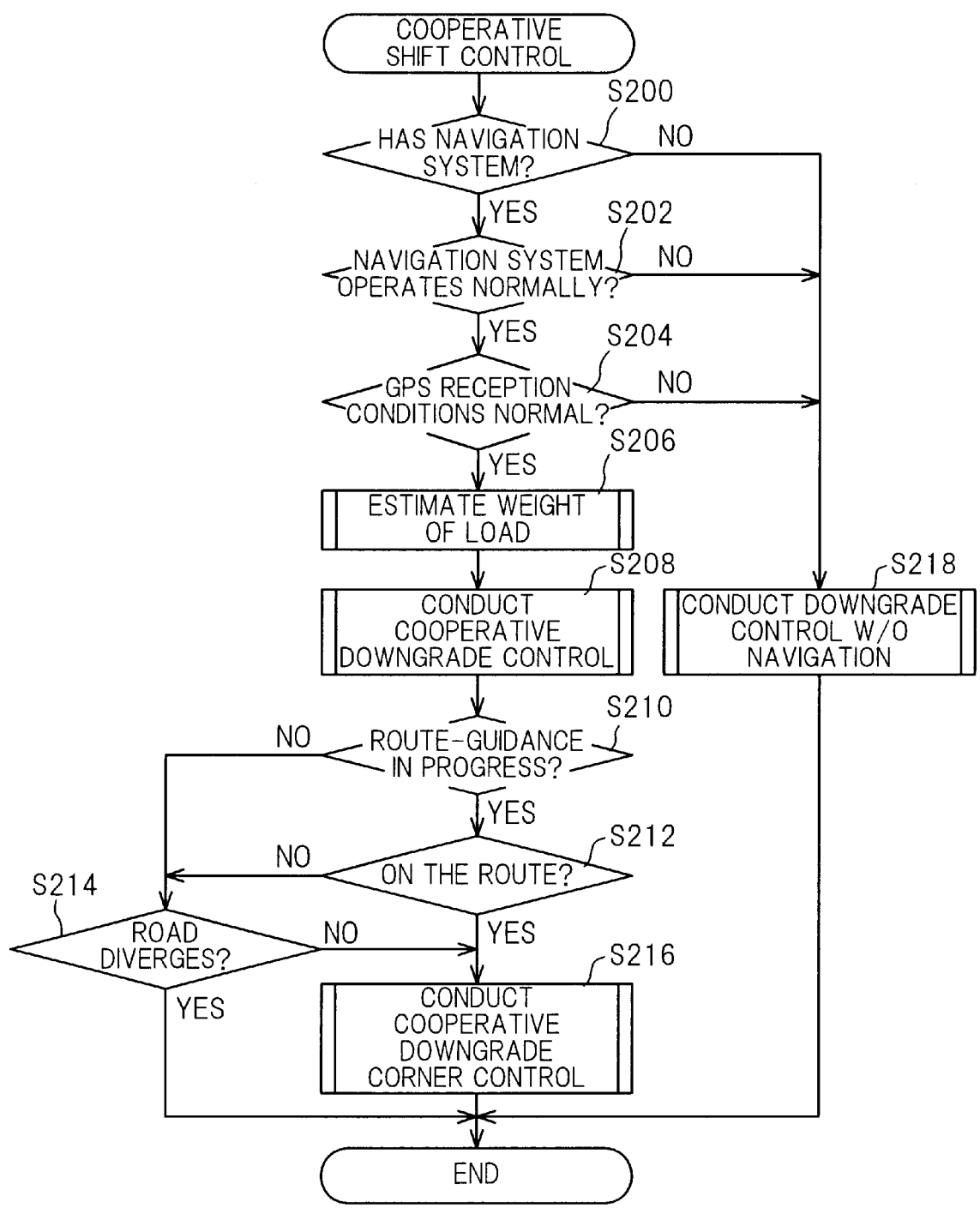
FIG. 11 is a flow chart showing the subroutine of cooperative shift control of the shift control with navigation information referred to in the flow chart of FIG. 2.

FIG. 11 is a flow chart showing the subroutine of the control.

Explaining this flow chart, the program begins in S200 in which it is determined whether the vehicle has, in fact, the navigation system 70. This is done by determining whether the CPU 50 is able to communicate with the CPU 72 of the navigation system 70.

When the result is affirmative, the program proceeds to S202 in which it is determined whether or not the navigation system 70 operates normally. This is done by communicating with the CPU 72 of the navigation system to discern whether the bit of an appropriate flag is set to 1 indicating that a problem has occurred in the navigation system 70.

If the result in S202 is affirmative, the program proceeds to S204 in which it is determined in a similar manner whether reception conditions from the GPS satellite are good. When the result is affirmative, the program proceeds to S206 in which the weight of the load (which the vehicle is carrying) is estimated.

Figure 12:
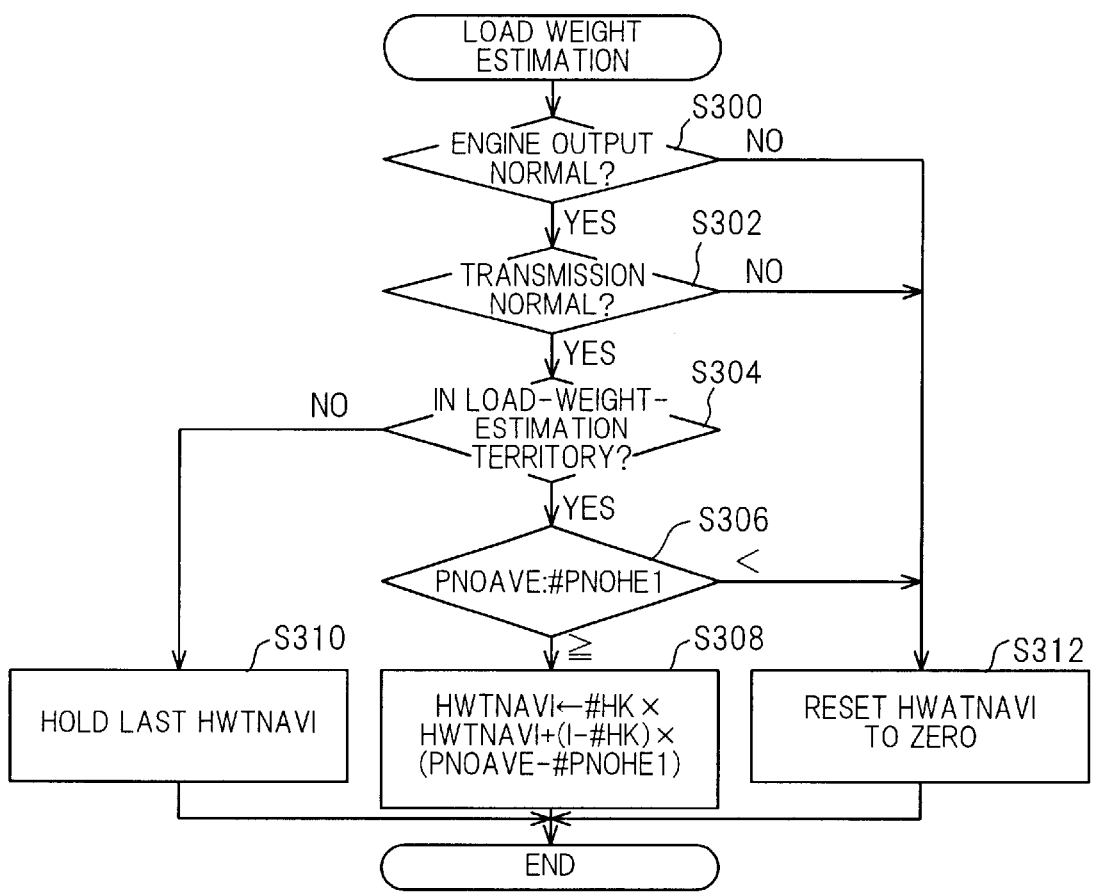
FIG. 12 is a flow chart showing the subroutine of load weight estimation referred to in the flow chart of FIG. 11.

FIG. 12 is a flow chart showing the estimation of the load weight.

Explaining the flow chart, the program begins in S300 in which it is determined whether the output of the engine E is normal. It is determined that the output of the engine E is normal when the detected coolant temperature is within a predetermined range, the atmospheric pressure (detected by an appropriate means) is greater or equal to a predetermined pressure (i.e., the vehicle is not traveling a place whose altitude is greater or equal to a predetermined altitude), and no ECU flag indicates the occurrence of engine trouble.

When the result in S300 is affirmative, the program proceeds to S302 in which it is determined whether the transmission T operates normal. The operation of transmission T is determined normal when the oil temperature (the temperature of Automatic Transmission Fluid) is within a predetermined range, and no ECU flag indicates the occurrence of transmission trouble. Instead of the provision of the oil temperature sensor S9, the output of the coolant temperature S7 can be used.

When the result in S302 is affirmative, the program proceeds to S304 in which it is determined whether the vehicle runs on a road within a load-weight-estimation territory. This is done by determining from the information of the navigation system 70 whether the vehicle is traveling on a level road (i.e., a road with no climbing resistance) and when the result is YES, it is determined that the vehicle runs on a road within the load-weight-estimation territory.

Figure 13:
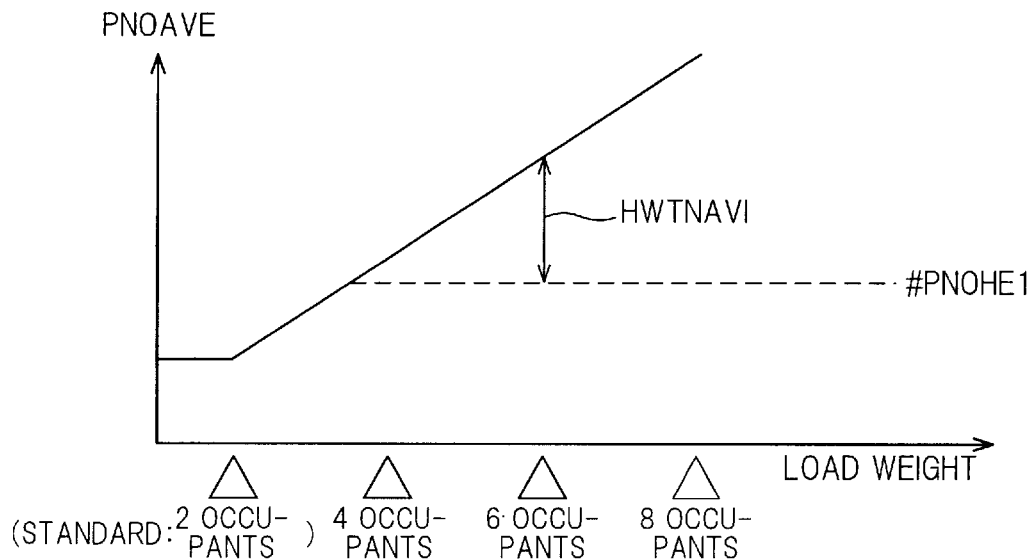
FIG. 13 is an explanatory graph showing the characteristic of a load-weight estimated value HWTNAVI referred to in the flow chart of FIG. 12.

When the result in S304 is affirmative, the program proceeds to S306 in which the aforesaid upgrade parameter PNOVAVE is compared with a threshold value #PNOHE1 (illustrated in FIG. 13). When it is determined that the upgrade parameter PNOAVE is greater or equal to the threshold value #PNOHE1, the program proceeds to S308 in which the threshold value #PNOHE1 is subtracted from the upgrade parameter PNOAVE and the resultant difference is determined as a load-weight estimated value HWTNAVI.

As illustrated, specifically, the load-weight estimated value HWTNAVI is calculated or updated through the learning control by obtaining a weighted average between the difference and HWTNAVI up to that time with the use of a weighting coefficient #HK. Since the weight of the load, more specifically, the number of occupants may vary after the engine is stopped, the calculated learning-control value is not held when the engine is stopped.

The threshold value #PNOHE1 should be a value indicating the upgrade parameter for the vehicle carrying a standard weight of the load (i.e., two occupants each having 50 kg weight), and is determined beforehand through experimentation. When the upgrade parameter PNOAVE is greater or equal to the threshold value #PNOHE1, since this means that the vehicle acceleration is not generated as expected, in other words, the weight of the load is greater than the standard weight, the load-weight estimated value HWTNAVI is thus calculated in S308 from the difference obtained by subtracting the threshold value #PNOHE1 from the upgrade parameter PNOAVE.

As illustrated in FIG. 13, assuming the weight of the load including two occupants each having 50 kg weight as the standard, the load-weight estimated value HWTNAVI is determined such that it increases with increasing upgrade parameter PNOAVE.

In the flow chart, when the result in S304 is negative, since this means the vehicle runs on an upgrade or downgrade road, the program proceeds to S310 in which the load-weight estimated value HWATNAVI calculated at the preceding cycle, i.e., the value calculated at the last program loop of the FIG. 2 flow chart is held.

When the result in S300 or S302 is negative, the program proceeds to S312 in which the weight of the load is at or near the standard and if the load-weight estimated value HWT-NAVI remains, the value is reset to zero. The same will also be applied when S306 finds that the upgrade parameter PNOAVE is less than the threshold value #PNOHE1.

Returning to the explanation of FIG. 11, the program proceeds to S208 in which a cooperative downgrade control is conducted.

Figure 14:
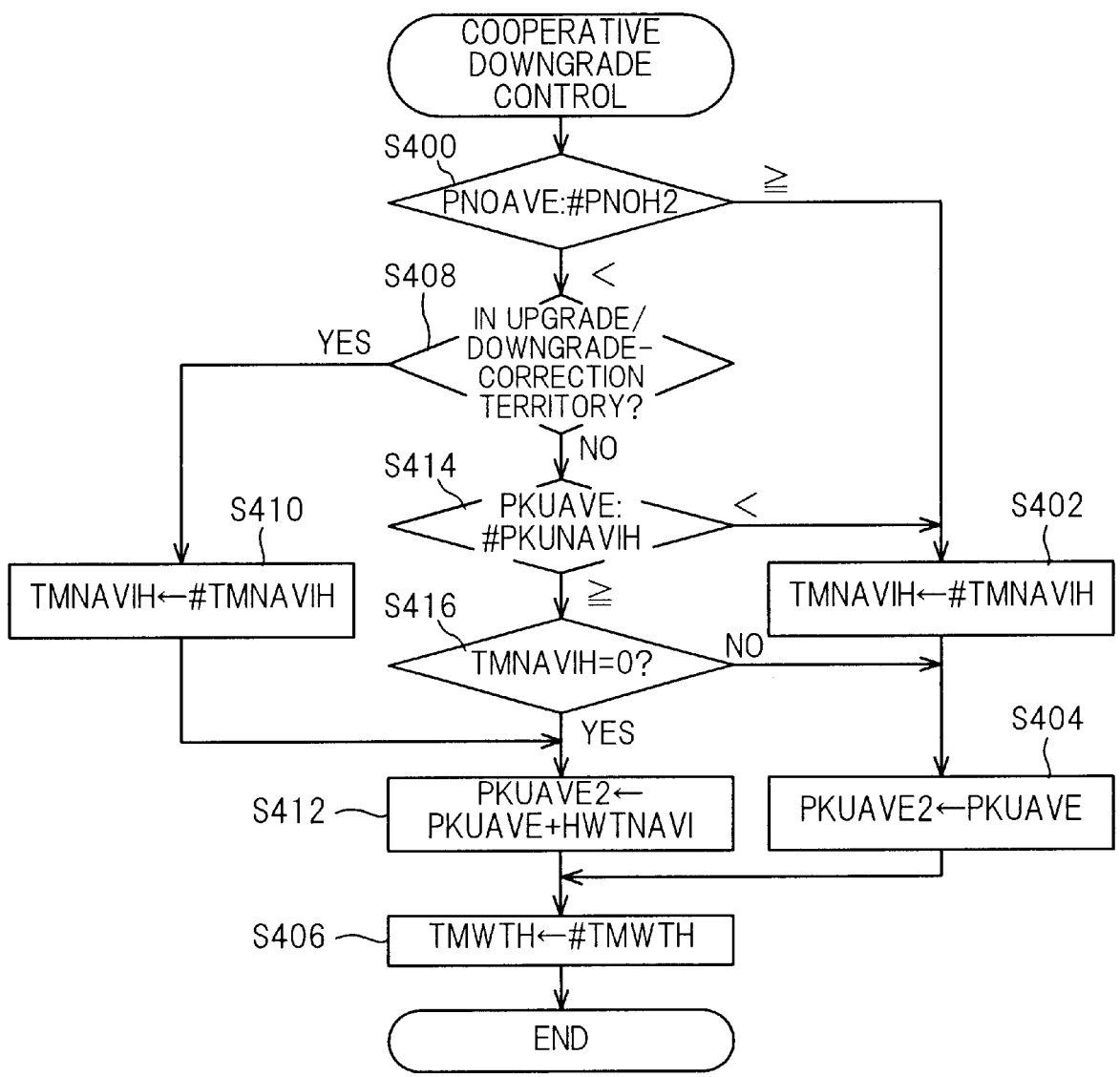
FIG. 14 is a flow chart showing the subroutine of a cooperative downgrade control referred to in the flow chart of FIG. 11.

FIG. 14 is a flow chart showing the subroutine of this control.

The program begins in S400 in which the upgrade parameter PNOAVE is compared with a second threshold value #PNOH2. The second threshold value #PNOH2 should be a value indicating that the vehicle runs on an upgrade road and is obtained beforehand through experimentation.

When it is determined in S400 that the upgrade parameter PNOAVE is greater or equal to the second threshold value #PNOH2, since this means that the vehicle runs on an upgrade road, the program proceeds to S402 in which a timer (down-counter) TMNAVIH is set with a predetermined value #TMNAVIH and is started to count down.

The program then proceeds to S404 in which the downgrade parameter PKUAVE is written as PKUAVE2, to S406 in which a timer (down-counter) TMWTH is set with a predetermined value #TMWTH and is started to count down. This timer will be used in a downgrade control without navigation (explained later).

When it is determined in S400 that the upgrade parameter PNOAVE is less than the second threshold value #PNOH2, since this means that the vehicle runs on a level road or a downgrade road, the program proceeds to S408 in which the vehicle runs on a road within a upgrade/downgrade-correction territory. This is done by determining from the navigation information whether the vehicle is traveling on an upgrade or downgrade road, more precisely a downgrade road, extending over a relative long distance (e.g., 1 km) such as a mountainous road, and when the result is YES, it is determined that the vehicle runs on a road within the upgrade/downgrade-correction territory.

When the result in S408 is affirmative, the program proceeds to S410 in which the aforesaid timer TMNAVIH is set with the predetermined value #THNAVIH and is started to count down, and to S412 in which the aforesaid load-weight estimated value HWTNAVI is added to the downgrade parameter PKUAVE to correct the same.

On the other hand, when the result in S408 is negative, the program proceeds to S414 in which the downgrade parameter PKUVAVE is compared with a third threshold value #PKUNAVIH. The third threshold value #PKUNAVIH should be a value indicating that the vehicle runs on a steep downgrade road greater to or equal to a predetermined downgrade, and is obtained beforehand through experimentation.

When S414 determines that the downgrade parameter PKUAVE is less than the third threshold value #PKUNAVIH, since this means that the vehicle runs on a level road or on a moderate downgrade road, the program proceeds to S402. On the other hand, when S414 determines that the downgrade parameter PKUAVE is greater or equal to the third threshold value #PKUNAVIH, since this means that the vehicle runs on a steep downgrade road, the program proceeds to S416 in which it is determined whether the aforesaid first timer TMNAVIH has reached zero.

When the result in S416 is negative, the program proceeds to S404. On the other hand, when the result in S416 is affirmative, the program proceeds to S412 in which the load-weight estimated value HWTNAVI is added to the downgrade parameter PKUAVE to correct (increase) the same.

Figure 15:
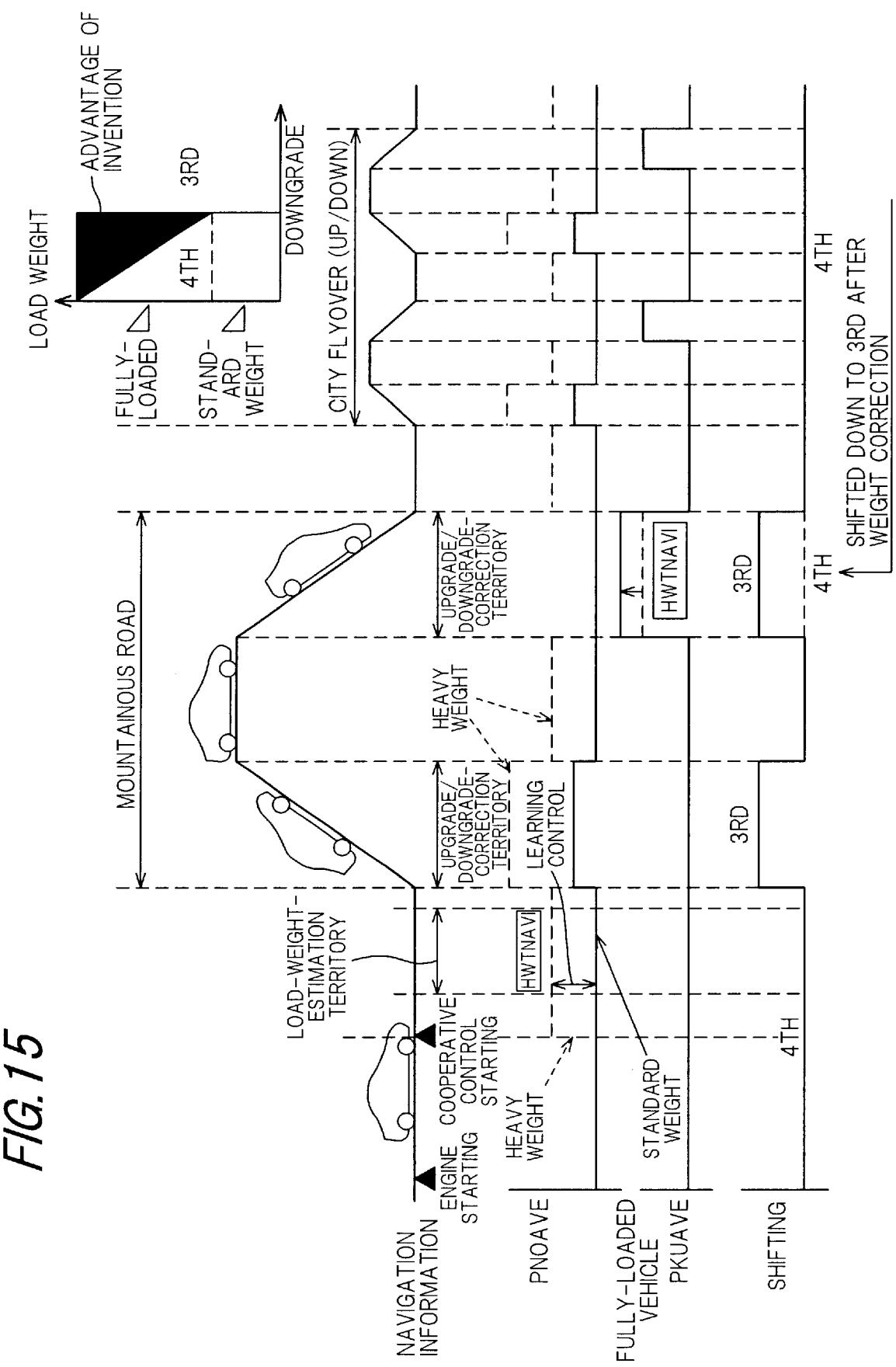
FIG. 15 is a time chart showing the procedures of the flow chart of FIG. 14.

Explaining the procedures shown in FIGS. 12 and 14 with reference to a time chart of FIG. 15, the load-weight estimated value exceeding the standard weight is calculated when it is determined that the vehicle runs on a level road from the navigation information, in other words, when the vehicle is not affected by the climbing resistance.

Then, when it is determined that the vehicle runs on a road within the upgrade/downgrade-correction territory, the downgrade parameter PKUVAVE is increased (corrected) by the load-weight estimated value HWTNAVI.

When it is determined that the vehicle runs on a road out of the upgrade/downgrade-correction territory, but it is determined from the downgrade parameter PKUVAVE that the vehicle runs on a steep downgrade road, the downgrade parameter PKUAVE is similarly corrected (increased), if the downgrade-running condition continues for the predetermined time #TMNAVIH (which is a value corresponding to 500 m or thereabout in distance).

With this, the downgrade parameter PKUAVE2 will be increased. As a result, as illustrated in FIG. 4, the map is switched from the level-road map to the slight-downgrade map, from the slight-downgrade map to the steep-downgrade map, increasing the likelihood that the 3rs gear will be used.

In particular, when running on a downgrade road, since the engine braking effect is likely to be generated, the vehicle operator's braking is reduced, thereby enhancing the drivability at the hill-descending. It should be noted here that PKUAVE2 is treated as the same parameter as PKUAVE in the flow charts of FIGS. 2, 10, etc.

Moreover, since the determination as to whether the vehicle runs on a road within the upgrade/downgrade-correction territory, is conducted based on the navigation information, errors such as those which occur when the vehicle encounters a short city flyover etc, will not occur. Even if the navigation information is temporarily invalid, since the downgrade parameter correction is implemented both the navigation information and the upgrade parameter indicates the same result, this control is not affected by the navigation information.

Furthermore, since the downgrade parameter correction is only carried out when the downgrade-running condition continues for the predetermined time (corresponding to 500 m), no map change will unnecessarily occur over a short distance such as when encountering a flyover in the city. Accordingly, the configuration can avoid unnecessary downshift to 3rd gear as illustrated by dashed lines at the portion mentioned as "CITY FLYOVER (UP/DOWN)" in FIG. 15.

Furthermore, it suffices if the navigation information includes at least the upgrade/downgrade-correction territory, more precisely the information indicating whether the vehicle is running on a mountainous down-grade road or not and the information of road corners or divergences (explained later). The data to be stored in the navigation system 70 is relatively smaller than that in the prior-art system, decreasing the volume of calculation and rendering the system advantageous in cost. Since the grade parameter is corrected and the shift control is effected, the control response is not degraded. Even when the instantaneous position of the vehicle is not detected accurately, the control is not affected by this insufficient detection.

Returning to the explanation of FIG. 11, the program then proceeds to S210 in which it is determined whether route-guidance is in progress. This is done by referring to the navigation system 70 to determine whether the route-guidance mode is selected. When the result is affirmative, the program proceeds to S212 in which it is determined whether the vehicle runs along the guided route. This is done by similarly referring to the navigation system 70.

When the result in S212 is affirmative, the program proceeds to S216 in which the cooperative downgrade corner control is conducted. This will be explained later.

When the result in S212 is negative, the program proceeds to S214 in which it is determined from the navigation information whether the road will diverge ahead. When the result is negative, the program proceeds to S216 in which the cooperative downgrade corner control is conducted. When the result in S214 is affirmative, since it is not sure which way the vehicle operator will take if no route-guidance is in progress, the program skips S216.

Figure 16:
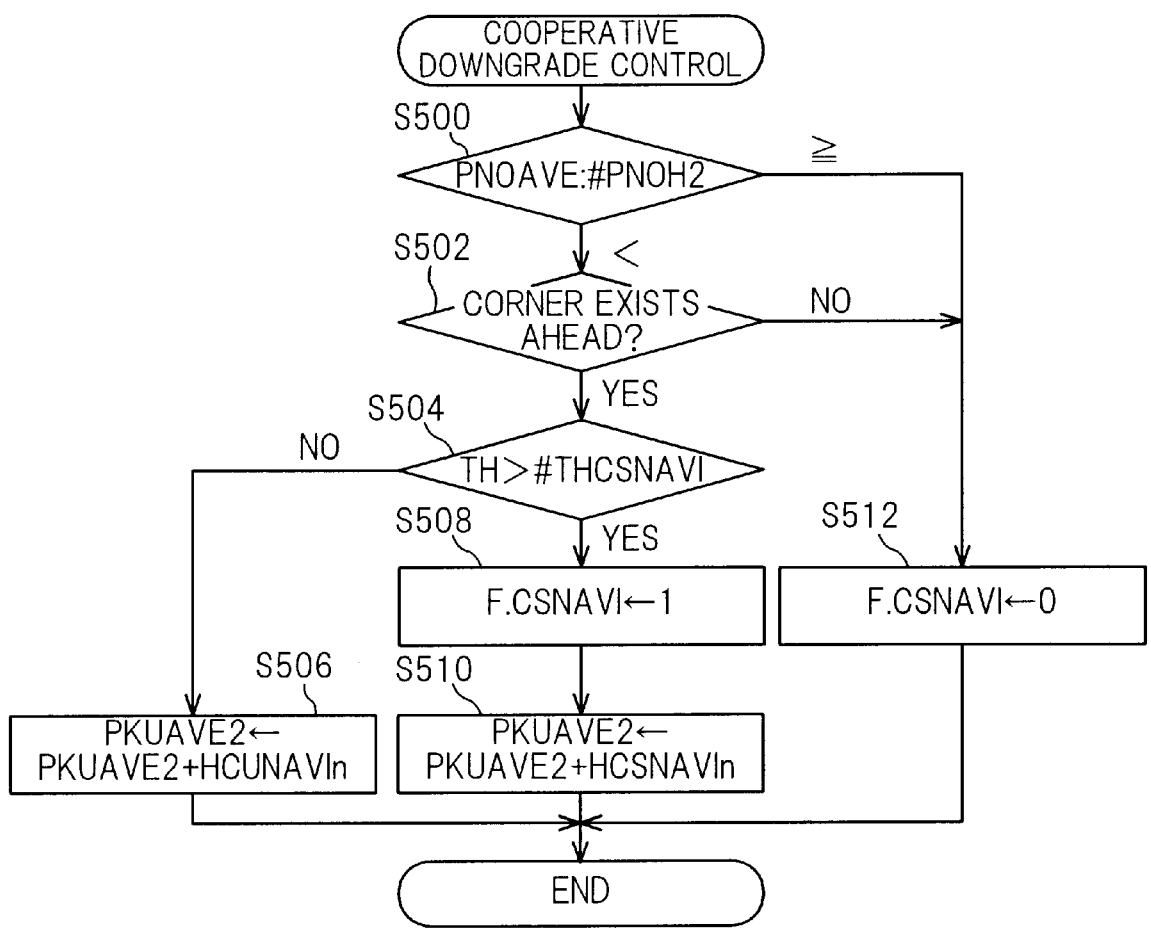
FIG. 16 is a flow chart showing the subroutine of cooperative downgrade corner control referred to in the flow chart of FIG. 11.

FIG. 16 is a flow chart showing the subroutine of the cooperative downgrade corner control.

The program begins in S500 in which the upgrade parameter PNOAVE is again compared with the second threshold value #PNOH2 and when the upgrade parameter PNOAVE is determined to be less than the second threshold value #PNOH2, since this means that the vehicle runs on a level road or a downgrade road, the program proceeds to S502 in which it is determined from the navigation information whether the road has a corner (curve) ahead of the vehicle. When the navigation information suggests the existence of corner, the curvature R of the corner is read out.

When the result in S502 is affirmative, the program proceeds to S504 in which it is determined whether the throttle opening TH is greater than a predetermined throttle opening #THCSNAVI. The threshold value #THCSNAVI should be a value indicating that the vehicle operator wants the shift control based on the corner-sport map at the corners, and is determined beforehand through experimentation.

Figure 18:
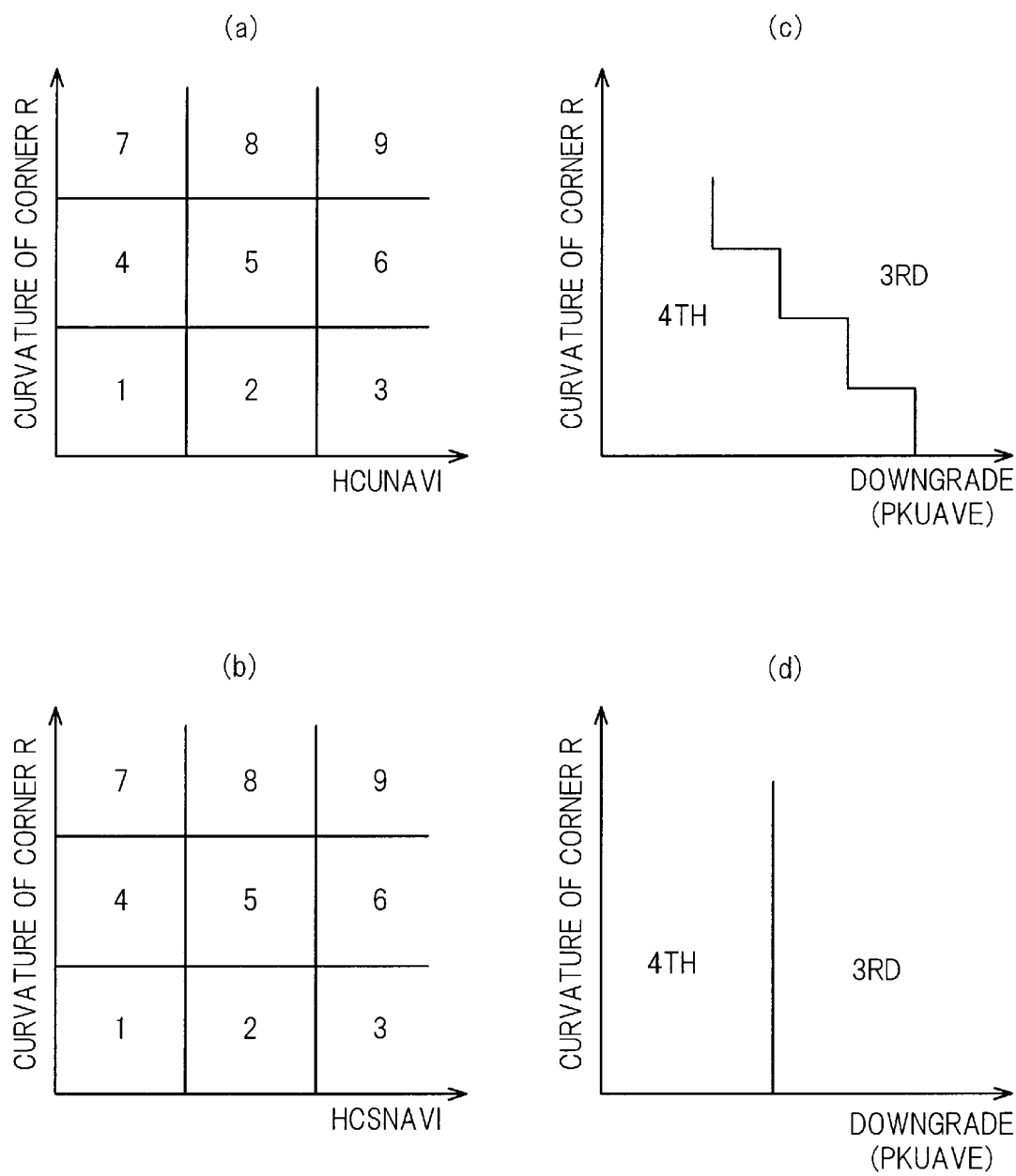
FIG. 18 is a set of explanatory graphs showing the characteristic of values referred to in the flow chart of FIG. 16.

When the result in S504 is negative, since this means that vehicle operator seems not to have such an intention, the program proceeds to S506 in which a predetermined value HCUNAVIn is added to the downgrade parameter PKUAVE to correct (increase) the same. The corrected value is rewritten as PKUAVE2. This leads the map to be changed to the steep-downgrade map or slight-downgrade map. The threshold value HCUNAVIn is not a fixed value, but is set such that it increases with increasing vehicle speed and corner curvature R as illustrated in FIG. 18($a$) which will be referred to later.

When the result in S504 is affirmative, since this means that the vehicle operator has such an intention, the program proceeds to S508 in which the bit (initial value 0) of a corner-sport-map discrimination flag F.CSNAVI is set to 1. (As a result, the result in S141 is affirmative in the flow chart of FIG. 10 and the program proceeds to S142 in which the corner-sport map is selected). The program then proceeds to S510 in which a second predetermined value HCSNAVIn is added to the downgrade parameter PKUAVE2 to correct (increase) the same.

In this embodiment, as illustrated in FIGS. 4 and 5, the corner-sport map has an equivalent relationship with the steep-downgrade map (map number 4). The embodiment is configured such that, at the situation where the steep-downgrade map can be selected, the corner-sport map is selected if the throttle opening TH is greater than the aforesaid prescribed value #THCSNAVI, while the steep-downgrade map is selected if the throttle opening TH is not greater than the aforesaid prescribed #THCSNAVI.

Figure 17:
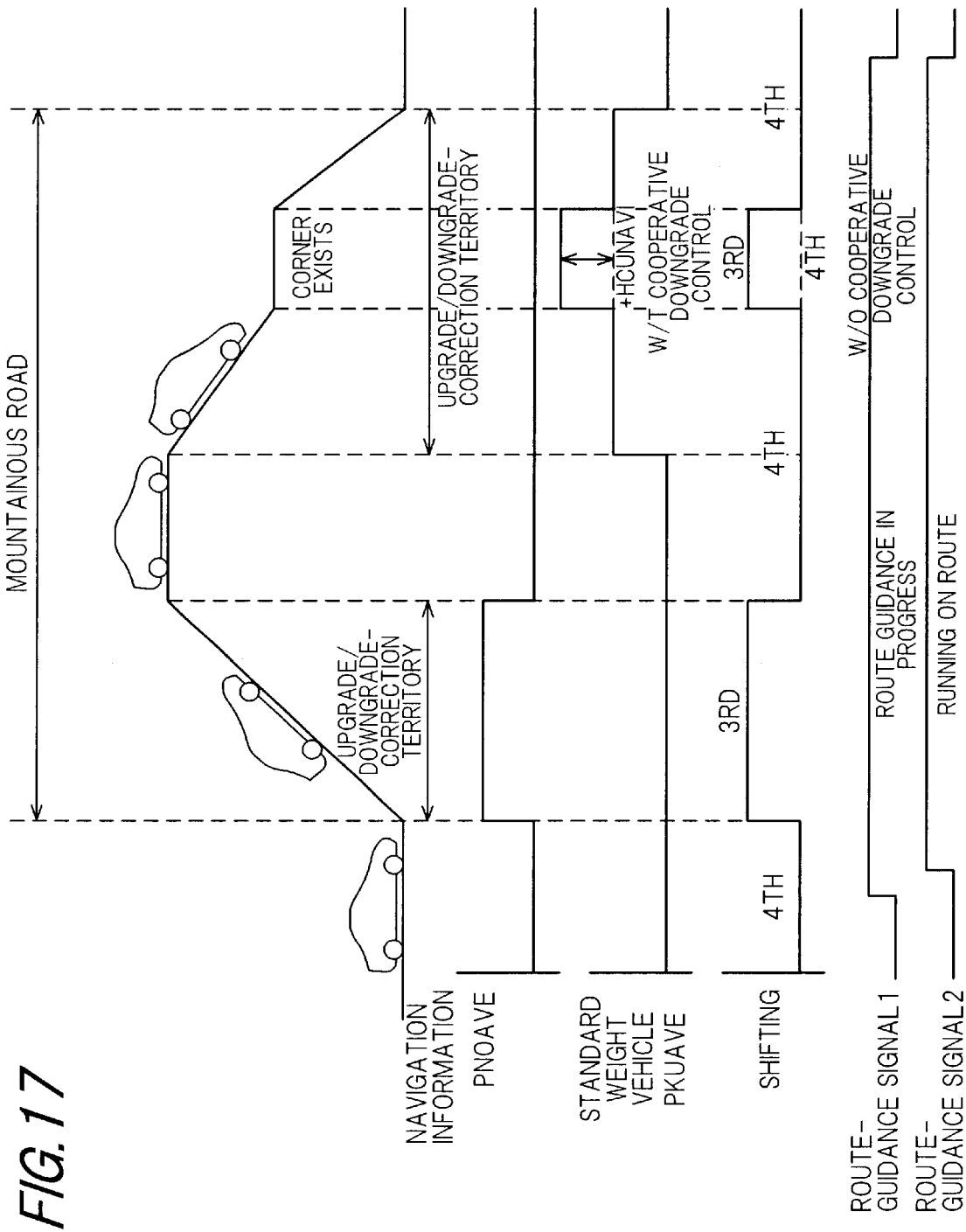
FIG. 17 is a time chart showing the procedures of the flow chart of FIG. 16.

As illustrated in FIG. 9, since the 3rd-gear region of the corner-sport map is broadened compared to that of the steep-downgrade map, 3rd gear is used when the vehicle runs along the downgrade corner as illustrated in FIG. 17, effecting the shift control just desired by the vehicle operator.

Similar to the aforesaid predetermined value HCUNAVIn, the predetermined value HCSNAVIn is set such that it increases with increasing vehicle speed and it also increases with increasing curvature of corner R as illustrated in FIG. 18($b$).

With this, 3rd gear is more likely to be used as the curvature of the corner increases, enabling to sufficiently respond to the vehicle operator's desire to increase the motive force and enhancing the drivability. This will be the same when the vehicle runs to the divergence road. As shown at the bottom of FIG. 17 and FIG. 18($c$)($d$), but for this control, the gear would be shifted to 4th, failing to match the vehicle operator's expectation sufficiently. Although the control is explained regarding 3rd and 4th gears in this embodiment, the control should not necessarily be limited to the description. The control will be applied from 1st to 3rd gears appropriately based on the vehicle speed, the curvature of corner and the throttle opening. In that case, since it suffices if the characteristics shown in FIG. 18($a$) are modified in response thereto, no detailed explanation will be needed.

Returning to the explanation of FIG. 16, when S500 finds that the upgrade parameter PNOAVE is greater or equal to the threshold value #PNOH2, since this means that the vehicle runs on an upgrade road, the program proceeds to S512 in which the bit of the aforesaid flag is reset to 0. The same will also be applied when the result in S502 is negative.

Returning to the explanation of FIG. 11, when the result in any of S200 to S204 is negative, since the navigation information is not usable, the program proceeds to S218 in which the downgrade control is conducted without using the navigation information. This is the aforesaid downgrade control without navigation information.

Figure 19:
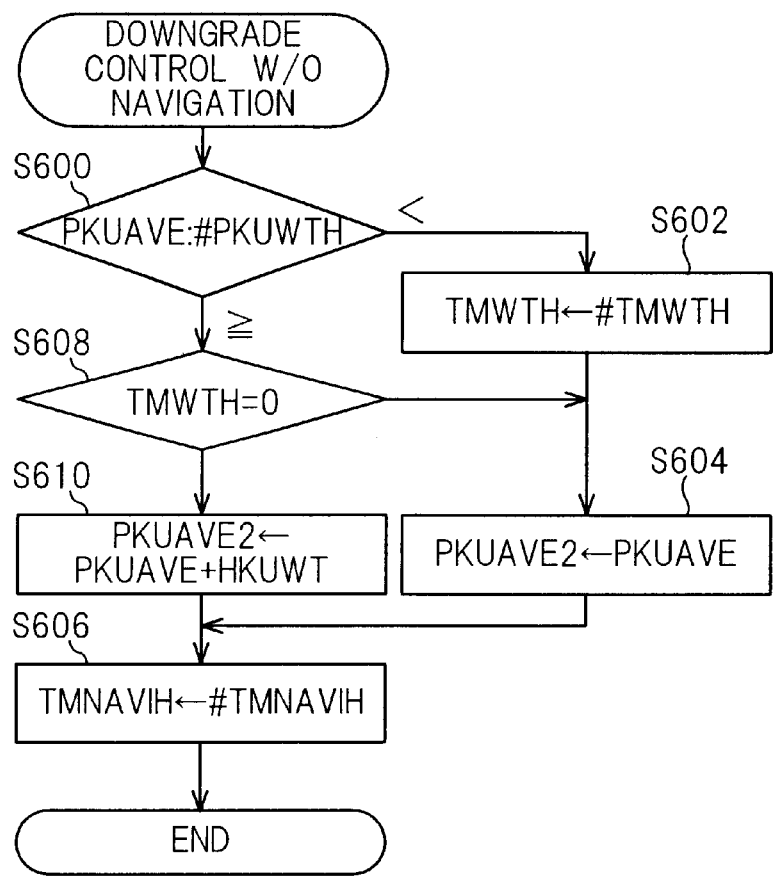
FIG. 19 is a flow chart showing the subroutine of downgrade control without navigation information referred to in the flow chart of FIG. 11.

FIG. 19 is a flow chart showing the subroutine of this control.

The program begins in S600 in which the downgrade parameter PKUAVE is compared with a predetermined value #PKUWTH. The predetermined value is a threshold value for discriminating whether the vehicle runs on a road which requires conducting the downgrade control without navigation information, and is obtained beforehand through experimentation.

When it is determined in S600 that the downgrade parameter PKUVAVE is less than the predetermined value #PKUWTH, since this means the vehicle runs on a level road or an upgrade road, the program proceeds to S602 in which the aforesaid timer (down-counter) is set with the aforesaid predetermined value #TMWTH and is started to measure time lapse, and to S604 in which the downgrade parameter PKUAVE is rewritten as PKUAVE2.

The program then proceeds to S606 in which the aforesaid timer TMNAVIH is set with the predetermined value #TMNAVIH and is started to measure time lapse.

On the other hand, when it is determined in S600 that the downgrade parameter PKUAVE is greater or equal to the predetermined value #PKUWTH, since this means the vehicle runs on a downgrade road, the program proceeds to S608 in which it is determined whether the value of timer TMWTH has reached zero and when the result is negative, the program proceeds to S604.

When the result in S608 is affirmative in the next or later program loop, the program proceeds to S610 in which a predetermined value HKUWT is added to the downgrade parameter PKUAVE to correct (increase) the same, and the corrected value is rewritten as PKUAVE2.

Figure 20:
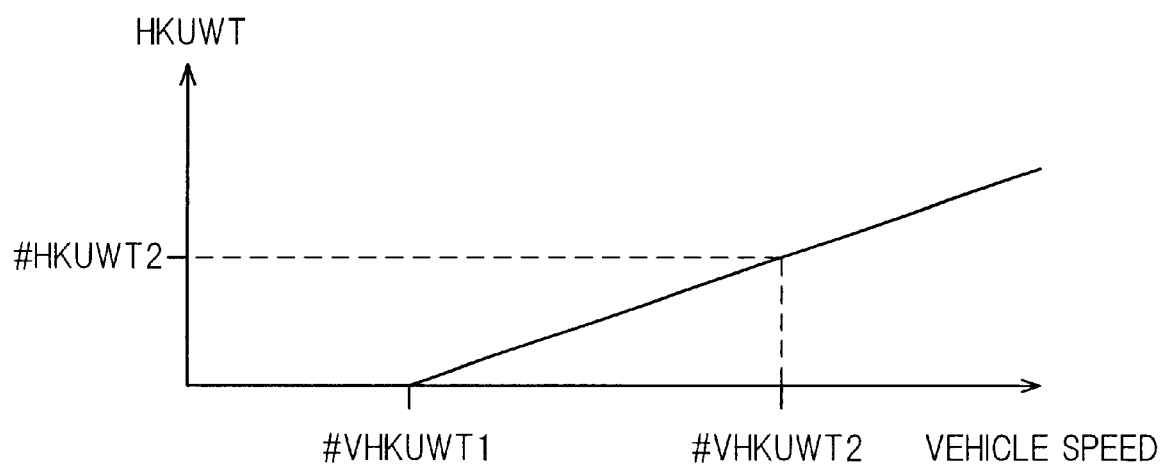
FIG. 20 is an explanatory graph showing the characteristic of a value referred to in the flow chart of FIG. 19.

FIG. 20 is an explanatory graph showing the table characteristic of the predetermined value HKUWT. As illustrated, the predetermined value HKUWT is set such that it increases with increasing vehicle speed.

Figure 21:
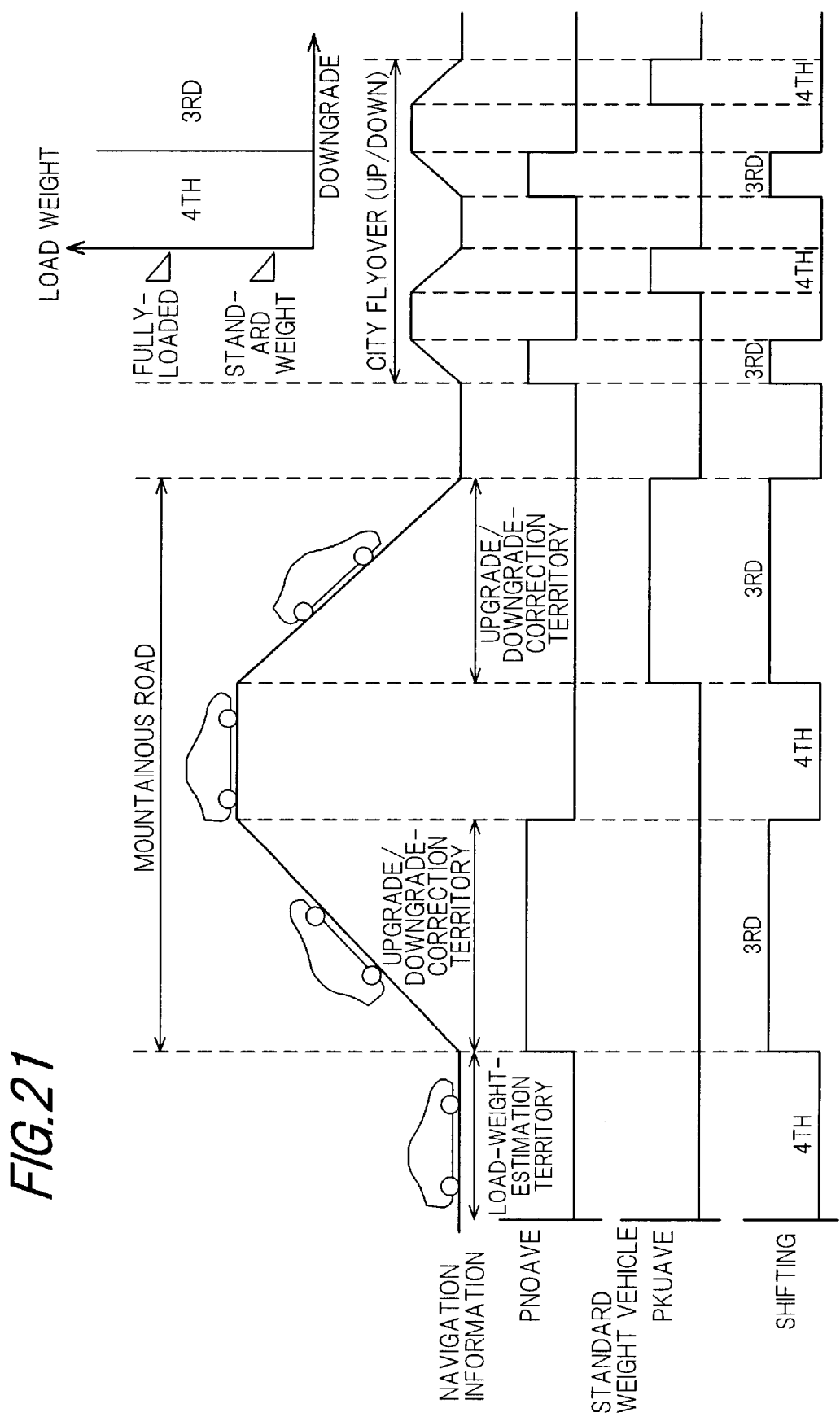
FIG. 21 is a time chart showing the procedures of the flow chart of FIG. 19.

FIG. 21 is a time chart showing the downgrade control without navigation information mentioned with reference to FIG. 19.

As mentioned above, when a predetermined downgrade (corresponding to #PKUWTH) continues for the predetermined time (#TMWTH), the downgrade parameter PKUAVE (PKUAVE2) is corrected (increased). As a result, the steep-downgrade map is selected and hence, the 3rd-gear region is frequently used, enabling to effect the engine braking effect sufficiently.

Since the embodiment is configured such that the grade parameter is corrected when it is determined based on the navigation information that the vehicle runs on a road within the upgrade/downgrade-correction territory (i.e., a specific road), it can determine the gear ratio more properly by incorporating the navigation information in the shift control. Even when the navigation information (i.e. road information) is temporarily invalid, since the navigation information (road information) is only used to determine whether the vehicle runs on the specific road (i.e., a road in the territory), the gear ratio determination is not affected thereby.

If the navigation information is given the priority as disclosed in the prior art, there will be an additional disadvantage that a correction value or manipulated variable will be small taking into account the possibility that the navigation information could be erroneous. In this embodiment, on the contrary, since the navigation information and the conventional shift control are used together, it becomes possible to set a correction value or manipulated variable to be larger, enabling to improve the response of control.

Moreover, having been configured in the foregoing manner, the 3rd gear region is likely to be used particularly when the vehicle runs on a downgrade road such as a mountainous road, enabling the vehicle operator to reduce the use of brake and hence, enhancing the drivability at running on a downgrade road.

Furthermore, since the weight of load is estimated and the grade parameter is corrected by the estimated value, the gear ratio can be determined properly.

Furthermore, it suffices if the navigation information includes at least the upgrade/downgrade-correction territory, more precisely the information indicating whether the vehicle runs on a mountainous down-grade road and the information of road corners or divergences. In other words, since the road grade information need not be stored, the data to be stored in the CD ROM 74 of the navigation system 70 is relatively smaller than that in the prior-art system, decreasing the volume of calculation and rendering the system advantageous in cost. Since the grade parameter is corrected and the shift control is effected, the control response is not degraded. Even when the instantaneous position of the vehicle is not detected accurately, the control is not affected by this insufficient detection.

The embodiment is configured to have a system for controlling an automatic transmission (T) of a vehicle (1) having an input shaft (MS) connected to an internal combustion engine (E) mounted on the vehicle and an output shaft (CS) connected to driven wheels (W) of the vehicle, the transmission transmitting output torque generated by the engine and inputted through the input shaft to the driven wheels through the output shaft, including: operating condition detecting means (vehicle speed sensor S2, throttle position sensor S1, S10) for detecting operating conditions of the engine and the vehicle including at least a vehicle speed (V) and a throttle opening (TH): grade parameter determining means (S10–S36) for determining a grade parameter (PNOAVE, PKUAVE) indicative of upgrade or downgrade of a road on which the vehicle runs; shift program selecting means (S46, S48, S50, S100–S144) for selecting one from among a plurality of shift programs based on the determined grade parameter to determine a gear ratio (SO) based on the selected shift program. The characteristic features is that the system includes road information outputting means (navigation system 70) for determining an instantaneous vehicle position and for outputting road information including that at the determined instantaneous vehicle position; and grade parameter correcting means (S45, S200–S218, S400–S416, S500–S512, S600–S610) for correcting the grade parameter based on at least one of the outputted road information and the grade parameter; wherein the shift program selecting means selects the one from among a plurality of shift programs based on the corrected grade parameters to determine the gear ratio based on the selected shift program.

The system further includes: specific road determining means (S45, S208, S400, S408, S414, S416, S600, S608) for determining whether the vehicle runs on a specific road including upgrade/downgrade road based on the outputted road information; and wherein the grade parameter correcting means (S412, S610) corrects the grade parameter based on the outputted road information when the vehicle is determined to run on the specific road.

In the system, the specific road is a downgrade road.

In the system, the specific road is a downgrade road extending a relatively long distance.

The system further includes: grade parameter comparing means (S414, S600) for comparing a downgrade parameter of the grade parameter (PKUAVE) with a threshold value (#PKUNAVIH, #PKUWTH); and wherein the grade parameter correcting means corrects the downgrade parameter when the downgrade parameter is greater or equal to the threshold value.

The system further includes: time measuring means (S416, S608) for measuring a time during which the vehicle runs on a downgrade road; and wherein the grade parameter correcting means corrects the grade parameter when the measured time is greater to or equal to a predetermined time (TMNAVIH, TMWTH).

The system further includes: time measuring means (S416, S608) for measuring a time during which the vehicle runs on a downgrade road; and wherein the grade parameter correcting means corrects the grade parameter when the measured time is greater to or equal to a predetermined time (TMNAVIH).

The system further includes: correction territory determining means (S206, S300–S304) for determining whether the vehicle runs on a road within a correction territory based on the outputted road information; and load weight estimating means (S306, S308) for estimating a weight of load of the vehicle (HWTNAVI) when the vehicles is determined to run on a road within the correction territory; and wherein the grade parameter correcting means (S308) corrects the grade parameter based on the estimated weight of load (HWTNAVI).

In the system, the load weight estimating means (S306) estimates the weight of load exceeding an expected standard weight (#PNOHE1), and the grade parameter correcting means corrects the grade parameter by a value corresponding to the weight exceeding the standard weight (PNOAVE-#PNOHE1).

In the system, the correction territory is a territory within which the road is level.

The system further includes: operating condition determining means (S202, S204) for determining whether operating conditions of the engine and the automatic transmission are normal; and wherein the load weight estimating means estimates the weight of load when operating conditions of the engine and the automatic transmission are determined to be normal.

The system further incudes: road corner determining means (S502) for determining whether the vehicle runs on a road which has a corner ahead of the vehicle; and wherein the grade parameter correcting means (S504, S506, S510) corrects the grade parameter when the vehicle runs on a road which has a corner ahead of the vehicle.

In the system, the grade parameter correcting means corrects a downgrade parameter of the grade parameter when the vehicle runs on a downgrade road which has a corner ahead of the vehicle.

The system further includes: vehicle operator intention estimating means (S504) for estimating an intention of vehicle operator; and wherein the grade parameter correcting means corrects the grade parameter based on the estimated intention of the vehicle operator such that the shift program selecting means selects the one from among a plurality of shift programs corresponding to the estimated intention of vehicle operator.

In the system, the grade parameter correcting means corrects the grade parameter by an amount which increases with at least increasing curvature of the corner.

It should be noted in the above, although five kinds of maps are prepared such that one of them is selected in response to the grade parameter, the invention should not be limited to this configurations. Instead, it is alternatively possible to decrease or increase the number of maps.

It should also be noted in the above, although the navigation system using the GPS satellite system is used to detect the current position, any other kind of navigation system may instead be used.

While the invention has thus been shown and described with reference to specific embodiments, it should be noted that the invention is in no way limited to the details of the described arrangements but changes and modifications may be made without departing from the scope of the appended claims.

What is claimed is:

1. A system for controlling an automatic transmission of a vehicle having an input shaft connected to an internal combustion engine mounted on the vehicle and an output shaft connected to driven wheels of the vehicle, the transmission transmitting output torque generated by the engine to the driven wheels through the output shaft, comprising:

operating condition detecting means for detecting operating conditions of the engine and the vehicle including at least a vehicle speed and a throttle opening:

grade parameter determining means for determining a grade parameter indicative of upgrade or downgrade of a road on which the vehicle runs, the grade parameter being calculated by the grade parameter determining means based upon a calculated actual vehicle acceleration and a predetermined predicted vehicle acceleration obtained from the detected operation conditions;

shift program selecting means for selecting one from among a plurality of shift programs based on the determined grade parameter to determine a gear ratio based on the selected shift program;

road information outputting means for determining an instantaneous vehicle position and for outputting road information including that at the determined instantaneous vehicle position;

specific road determining means for determining whether the vehicle runs on a specific road including an upgrade/downgrade road based on the outputted road information;

grade parameter comparing means for comparing the grade parameter with a threshold value; and grade parameter correcting means for correcting the grade parameter to increase the grade parameter when the grade parameter is greater or equal to the threshold value when the vehicle is determined to run on the specific road;

wherein the shift program selecting means selects the one from among a plurality of shift programs based on the corrected grade parameters to determine the gear ratio based on the selected shift program.

2. A system according to claim 1, wherein the specific road is a downgrade road.

3. A system according to claim 2, wherein the specific road is a downgrade road extending a relatively long distance.

4. A system according to claim 1, further including:

time measuring means for measuring a time during which the vehicle runs on a downgrade road; and wherein the grade parameter correcting means corrects the grade parameter when the measured time is greater or equal to a predetermined time.

5. A system according to claim 1, further including:

time measuring means for measuring a time during which the vehicle runs on a downgrade road; and wherein the grade parameter correcting means corrects the grade parameter when the measured time is greater to or equal to a predetermined time.

6. A system according to claim 1, further including:

correction territory determining means for determining whether the vehicle runs on a road within a correction territory based on the outputted road information; and load weight estimating means for estimating a weight of load of the vehicle when the vehicles is determined to run on a road within the correction territory; and wherein the grade parameter correcting means corrects the grade parameter based on the estimated weight of load.

7. A system according to claim 6, wherein the load weight estimating means estimates the weight of load exceeding an expected standard weight, and the grade parameter correcting means corrects the grade parameter by a value corresponding to the weight exceeding the standard weight.

8. A system according to claim 6, wherein the correction territory is a territory within which the road is level.

9. A system according to claim 6, further including:

operating condition determining means for determining whether operating conditions of the engine and the automatic transmission are normal; and wherein the load weight estimating means estimates the weight of load when operating conditions of the engine and the automatic transmission are determined to be normal.

10. A system according to claim 1, further including;

road corner determining means for determining whether the vehicle runs on a road which has a corner ahead of the vehicle; and wherein the grade parameter correcting means corrects the grade parameter when the vehicle runs on a road which has a corner ahead of the vehicle.

11. A system according to claim 10, wherein the grade parameter correcting means corrects a downgrade parameter of the grade parameter when the vehicle runs on a downgrade road which has a corner ahead of the vehicle.

12. A system according to claim 11, further including:

vehicle operator intention estimating means for estimating an intention of vehicle operator; and wherein the grade parameter correcting means corrects the grade parameter based on the estimated intention of the vehicle operator such that the shift program selecting means selects the one from among a plurality of shift programs corresponding to the estimated intention of vehicle operator.

13. A system according to claim 11, wherein the grade parameter correcting means corrects the grade parameter by an amount which increases with at least increasing curvature of the corner.

* * * * *